United States Patent
Masuzawa et al.

(10) Patent No.: US 9,113,099 B2
(45) Date of Patent: Aug. 18, 2015

(54) IMAGING DEVICE AND PROTECTION DEVICE OF SOLID-STATE IMAGING DEVICE

(75) Inventors: Tsuyoshi Masuzawa, Kanagawa (JP); Hiroki Hagiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 47 days.

(21) Appl. No.: 14/124,295

(22) PCT Filed: Jun. 29, 2012

(86) PCT No.: PCT/JP2012/066649
§ 371 (c)(1),
(2), (4) Date: Jan. 9, 2014

(87) PCT Pub. No.: WO2013/008644
PCT Pub. Date: Jan. 17, 2013

(65) Prior Publication Data
US 2014/0118594 A1 May 1, 2014

(30) Foreign Application Priority Data
Jul. 8, 2011 (JP) ................................. 2011-152129

(51) Int. Cl.
*H04N 5/335* (2011.01)
*H04N 5/372* (2011.01)
*H04N 5/3728* (2011.01)
*H04N 5/376* (2011.01)

(52) U.S. Cl.
CPC ............. *H04N 5/372* (2013.01); *H04N 5/3728* (2013.01); *H04N 5/3765* (2013.01)

(58) Field of Classification Search
CPC .... H04N 5/3765; H04N 5/372; H04N 5/3728
USPC ............................................................ 348/311
See application file for complete search history.

(56) References Cited

U.S. PATENT DOCUMENTS

2001/0032054 A1* 10/2001 Kimoto et al. .................. 702/24
2003/0038613 A1*  2/2003 Tupper et al. ................. 323/282
(Continued)

FOREIGN PATENT DOCUMENTS

| JP | 07-284026 | 10/1995 |
| JP | 10-327360 | 12/1998 |

(Continued)

OTHER PUBLICATIONS

International Search Report; Application No. PCT/2012/066649; Filed: Jun. 29, 2012. Completion of International Search Report: Jul. 27, 2012. (Form PCT/ISA/210).
Written Opinion of the International Searching Authority; Application No. PCT/2012/066649; Filed: Jun. 29, 2012. Report Dated: Aug. 7, 2012. (Form PCT/ISA/220 and PCT/ISA/237).

*Primary Examiner* — Usman Khan
(74) *Attorney, Agent, or Firm* — Fishman Stewart Yamaguchi PLLC

(57) ABSTRACT

Protection of a solid-state imaging device is disclosed. One example of a protection unit includes a capacitor connected between an output terminal of a shutter drive pulse of a pulse drive unit and a substrate voltage terminal of a solid-state imaging device, a diode connected between a predetermined potential point and the substrate voltage terminal, and a clamp circuit configured from a resistor element connected between the substrate voltage terminal and a reference potential point. An anode end of the diode is connected to the predetermined potential point to which a potential corresponding to a rated voltage of the substrate voltage terminal is applied.

20 Claims, 9 Drawing Sheets

(56) References Cited

U.S. PATENT DOCUMENTS

| | | | |
|---|---|---|---|
| 2004/0263093 A1* | 12/2004 | Matsubayashi et al. | 315/248 |
| 2007/0115038 A1* | 5/2007 | Higashi et al. | 327/207 |
| 2009/0027503 A1* | 1/2009 | Yoshioka | 348/180 |
| 2009/0126692 A1* | 5/2009 | Bolz | 123/490 |
| 2010/0289787 A1* | 11/2010 | Omoto et al. | 345/211 |
| 2011/0279099 A1* | 11/2011 | Obatake | 323/237 |
| 2012/0139632 A1* | 6/2012 | Mineyama et al. | 330/253 |

FOREIGN PATENT DOCUMENTS

| | | |
|---|---|---|
| JP | 2005-123712 | 5/2005 |
| JP | 2007-060453 | 3/2007 |
| JP | 2009-239433 | 10/2009 |

* cited by examiner

IMAGING DEVICE AND PROTECTION DEVICE OF SOLID-STATE IMAGING DEVICE

TECHNICAL FIELD

The technology to be disclosed in the present specification relates to an imaging device and a protection device of a solid-state imaging device.

BACKGROUND ART

Among solid-state imaging devices, there is one capable of using a so-called electronic shutter function (an electric charge sweep operation in a substrate direction) to sweep a generated electric charge in the substrate direction by superimposing an electronic shutter pulse on a substrate voltage. For example, the substrate voltage can adjust a saturation signal amount of a light-receiving part. By changing the substrate voltage in a drive mode, the saturation signal amount necessary in each drive mode can be adjusted. A signal can be reset by application of a shutter pulse to the substrate voltage. This enables adjustment of an exposure time. Here, to drive a solid-state imaging device, a driver (pulse drive unit) is used. Both of the solid-state imaging device and the driver (especially, a vertical driver) require a voltage value away from an operation voltage value (for example, +5V system, +3V system, +1.8V system, and the like) required in other various circuits, and usually, two voltages having different polarities are necessary (because a reference potential is 0 V). Therefore, these two types of voltage are increased/decreased and supplied by a voltage conversion circuit (DC/DC converter, or the like), for example.

Here, in a driver capable of performing an electric charge sweep operation in the substrate direction, the electric charge sweep control is performed by an electronic shutter pulse driver circuit in the driver in order to control a timing of the start of storing an electric charge of a photoelectric conversion part such as a photodiode, and the electronic shutter pulse is applied to a first polarity substrate (for example, an n-type substrate) through a separate wiring from a transfer clock. A substrate voltage control circuit is connected to a substrate voltage terminal of the first polarity substrate, and a predetermined voltage (reverse bias voltage) is always applied to the first polarity substrate during the operation. At the sweep of an electric charge, the electronic shutter pulse driver circuit outputs a pulse signal, and a voltage of the pulse signal is superimposed on an applied voltage of the substrate voltage control circuit, a reverse bias voltage stronger than usual is applied to the first polarity substrate, and the stored electric charge is swept.

Meanwhile, when such a solid-state imaging device is driven, a voltage range applicable in each terminal or between terminals is defined as an absolute maximum rating. Such a rating is observed in a steady state. However, for example, the rating may deviate from the rating when a power supply switch of the imaging device is turned ON/OFF, or the like. Therefore, depending on a configuration of the electronic shutter pulse circuit between the driver and the solid-state imaging device, an abnormal voltage exceeding the absolute maximum rating may be applied to the substrate voltage terminal at the start or the interruption of a power supply, and there is a concern that the solid-state imaging device may be deteriorated or broken.

As a measure, for example, Japanese Patent Application Laid-Open No. 10-327360 discloses a protection circuit in which a clamp circuit including a DC cut capacitor, a clamp diode, and a discharge resistor is formed into a two-stage configuration. The diode is connected to the resistor in parallel, and an anode end is connected to a reference potential (usually, 0 V). That is, the diode is connected to be conducted by a negative voltage of a substrate voltage terminal. A connection point of the capacitor, a cathode end of the diode, and the resistor of a clamp circuit in the second stage is connected to the substrate voltage terminal. Accordingly, when a potential of the substrate voltage terminal exceeds a forward drop voltage of the diode at the start or the interruption of a power supply (in reality, becomes larger toward the negative potential side), the diode is turned ON. Therefore, the potential of the substrate voltage terminal is clamped to nearly the forward drop voltage of the diode. This can prevent a negative voltage that falls below the rating from being provided to the substrate voltage terminal.

CITATION LIST

Patent Document

Patent Document 1: Japanese Patent Application Laid-Open No. 10-327360

SUMMARY OF THE INVENTION

Problems to be Solved by the Invention

However, the protection circuit disclosed in Japanese Patent Application Laid-Open No. 10-327360 requires six elements at minimum because the clamp circuit including the capacitor, the diode, and the resistor has the two-stage configuration. In addition, there is a difficulty that a special expensive diode such as a Schottky diode needs to be selected as the diode of the second-stage clamp circuit. Note that, in the above-described example, the electronic shutter drive pulse has been described. However, other drive pulses may have similar problems depending on the supply circuit of a drive pulse.

Therefore, an objective of the present disclosure is to provide a technology that decreases the number of elements and reduces restriction on selection of components in a protection device of a solid-state imaging device and an imaging device using the protection device.

Solutions to Problems

An imaging device according to a first aspect of the present disclosure includes: a solid-state imaging device in which a voltage pulse is applied to a first polarity semiconductor; a pulse drive unit configured to output a drive pulse of the solid-state imaging device; and a protection unit arranged between the pulse drive unit and the solid-state imaging device. The protection unit includes a capacitor connected between an output terminal of the pulse drive unit and a voltage terminal of the solid-state imaging device, a diode connected between a potential point and the voltage terminal, and a resistor element connected between the voltage terminal and a potential point. An anode end of the diode is connected to the potential point to which a potential of the voltage terminal is applied. Then, at a start of a power supply to the solid-state imaging device, the potential of the potential point is started before the start of a power supply. Each of imaging devices described in the dependent claims of the imaging device according to the first aspect of the present disclosure defines a further advantageous specific example of the imaging device according to the first aspect of the present disclosure.

A protection device of a solid-state imaging device according to a second aspect of the present disclosure is a protection device that protects the solid-state imaging device in which a voltage pulse is applied to a first polarity semiconductor, and is arranged between a pulse drive unit that outputs a drive pulse of the solid-state imaging device and the solid-state imaging device. To be specific, the protection device includes a capacitor connected between an output terminal of the pulse drive unit and a voltage terminal of the solid-state imaging device, a diode connected between a potential point and the voltage terminal, and a resistor element connected between the voltage terminal and a potential point. An anode end of the diode is connected to the potential point to which a potential of the voltage terminal is applied. Then, at a start of a power supply to the solid-state imaging device, the potential of the potential point is started before the start of a power supply. In the protection device according to the second aspect of the present disclosure, the technologies and techniques described in the dependent claims of the imaging device according to the first aspect of the present disclosure are similarly applicable, and configurations to which the technologies and techniques are applied define further advantageous specific examples of the protection device according to the second aspect.

In a real sense, a protection unit or a protection device is configured from a clamp circuit including a capacitor, a diode, and a resistor element. The capacitor serves a DC cut function between a pulse drive unit and a solid-state imaging device. The diode has a clamp function. The resistor element serves a discharge function. In short, in the technology to be disclosed in the present specification, a simple (the number of elements is three) clamp circuit including a DC cut capacitor, a clamp diode, and a discharge resistor element is used as a function part that protects the solid-state imaging device from deterioration or breakage. Here, by connecting an anode end of the diode to a potential point to which a potential of a voltage terminal is applied, the diode is always subjected to a reverse bias and is turned OFF when an AC component of a drive pulse (for example, an electronic shutter drive pulse) is input to the voltage terminal of the solid-state imaging device. Therefore, the diode is usually OFF and there is no power consumption. Further, a special expensive diode is unnecessary. Therefore, restriction on the selection of components can be reduced. On the other hand, at an abnormal condition where the diode is turned ON, the potential of the voltage terminal is held to a clamp potential by the diode. Accordingly, the solid-state imaging device can be protected from deterioration or breakage.

Effects of the Invention

According to an imaging device and a protection device of a solid-state imaging device of the first aspect of the present disclosure, a protection technology of a solid-state imaging device capable of decreasing the number of elements and reducing restriction on selection of components can be provided.

MODE FOR CARRYING OUT THE INVENTION

Figure 1:
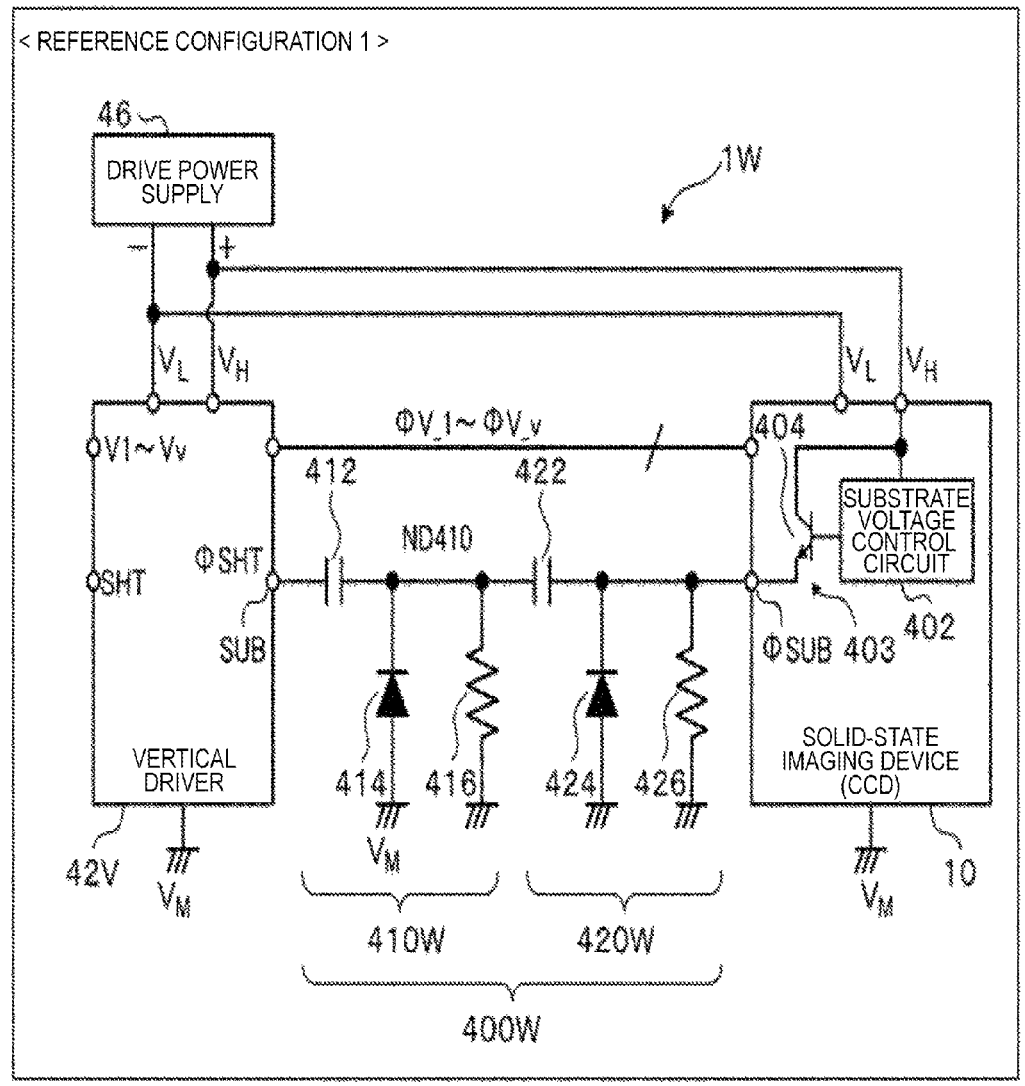
FIG. 1 is a diagram (circuit configuration diagram) describing an imaging device and a protection device of Reference Configuration 1.

Hereinafter, embodiments of a technology disclosed in the present specification will be described in detail with reference to the drawings. When function elements are distinguished by types, the function elements are described with reference elements of an alphabet, an "_n" (n is a numerical figure), or a combination thereof, while when they are not distinguished and described, the reference elements are omitted. The same applies to the drawings.

Description will be given in the following order.
1. Overall Outline
2. Reference Configurations
3. Basic Principle of Element Protection
4. Specific Application Examples
   Example 1: a power supply for a horizontal driver is used and a substrate voltage control circuit is arranged in a solid-state imaging device
   Example 2: a power supply for a horizontal driver is used and a substrate voltage control circuit is arranged in a driver
   Example 3: a power supply for a horizontal driver is used and a substrate voltage control circuit is arranged outside
   Modifications: a power supply for a CCD output circuit is used and a substrate voltage control circuit is arranged in a solid-state imaging device
   Example 4: power supply for other function parts is used
   <Overall Outline>
   First, hereinafter, basic matters will be described. In an imaging device and a protection device of a solid-state imaging device disclosed in the present specification, the protection device is interposed between the solid-state imaging device and a pulse drive unit (for example, in a wiring system of a shutter drive pulse). As the solid-state imaging device, one in which a pulse of a voltage is applied to a first polarity semiconductor is used. For example, a solid-state imaging device is used, which is configured such that a pulse of a voltage is applied to a first polarity semiconductor substrate as a shutter drive pulse, so that an unnecessary electric charge stored in an electric charge storage part can be swept to the first polarity semiconductor substrate according to the applied voltage. The pulse drive unit outputs a drive pulse of the solid-state imaging device. The protection device arranged between the pulse drive unit and the solid-state imaging device (for example, in the wiring system of a shutter drive pulse) has a function to protect the solid-state imaging device from deterioration or breakage. For example, the pulse drive unit outputs drive pulses of a vertical transfer system and a horizontal transfer system. As an example, a shutter drive pulse can be focused. Note that this is a mere example, and a protection technique related to the shutter drive pulse can be similarly applied to other drive pulses depending on the supply circuit of a drive pulse.

To realize the protection function, a simple clamp circuit (in which the number of elements is three) configured from a DC cut capacitor, clamp diode, and a discharge resistor element is used as a function part that protects the solid-state imaging device from deterioration or breakage. An anode end of the diode is connected to a potential point to which a potential of a voltage terminal is applied (to be specific, a potential point to which a potential corresponding to a rated voltage of the voltage terminal is applied). At the start of a power supply to the solid-state imaging device, the potential of the potential point is started before the start of the power supply. By the connection of the anode end to the potential point, since the diode is always in a reverse bias state at the usual operation, the diode is turned OFF and no power consumption. Therefore, a special expensive diode is unnecessary, and there is no restriction on selection of components. Therefore, a regular diode can be used. An abnormal situation happens in which the diode is turned ON at the start or the interruption of the power supply, on the other hand, the potential of the voltage terminal is held to the clamp potential by the diode. Therefore, the solid-state imaging device is not deteriorated and broken.

In the imaging device, there is a request of downsizing and thinning, and there is a demand of reduction in the number of components as much as possible. The reduction in the number of components is demanded for reduction in cost. For example, the request is increased when performing SiP, which requires reduction in components in a set. By applying a technology of an imaging device and a protection device of a solid-state imaging device disclosed in the present specification, the demand can be met.

In the imaging device and the protection device of a solid-state imaging device disclosed in the present specification, a potential corresponding to a maximum rated voltage of the voltage terminal may be favorably applied to the potential point. If the potential corresponding to a maximum rated voltage, which is the most severe condition, is applied to the potential point rather than a general rated voltage, the solid-state imaging device can be reliably protected from deterioration or breakage.

Here, to realize "corresponding to a rated voltage of the voltage terminal" or "corresponding to a maximum rated voltage of the voltage terminal", it is favorable to consider a forward drop voltage of the diode. To be specific, it is favorable that a potential falling below a sum of the rated voltage of the voltage terminal or the maximum rated voltage and the forward drop voltage of the diode is applied to the potential point. This is because the diode connected to the voltage terminal is avoided being turned ON at the usual operation, and the solid-state imaging device is protected from deterioration or breakage at the start or the interruption of the power supply.

In addition, it is favorable to consider a variation in "the rated voltage of the voltage terminal" and "the maximum rated voltage of the voltage terminal", or a variation in the forward drop voltage of the diode. To be specific, it is favorable that a potential falling below a sum of the rated voltage or the maximum rated voltage of the voltage terminal and a minimum value of the forward drop voltage of the diode is applied to the potential point. In doing so, even if there are variations and the like, the diode connected to the voltage terminal can be avoided being turned ON at the usual operation, the influence on the usual operation can be reliably prevented without depending on the variations and the like, and the solid-state imaging device can be protected from deterioration or breakage and the like at the start or the interruption of the power supply.

In the imaging device and the protection device of a solid-state imaging device disclosed in the present specification, it is favorable to define the order of start (rising) and interruption (falling) of the potential point, and start (rising) and interruption (falling) of the power supply to the vertical pulse drive unit that outputs a drive pulse of the solid-state imaging device or the vertical transfer system.

For example, when the pulse drive unit includes the vertical pulse drive unit that outputs a drive pulse of the vertical transfer system and a horizontal pulse drive unit that outputs a drive pulse of the horizontal transfer system, it is favorable that the potential of the potential point is started before the start of the power supply at the start of the power supplies to the vertical pulse drive unit and the solid-state imaging device. Further, as the power supply for the solid-state imaging device, one that outputs a first electrical potential in a first direction with respect to a reference potential and corresponding to a first polarity and a second electrical potential in a second direction opposite to the first direction with respect to the reference potential is used. When the pulse drive unit includes the vertical pulse drive unit that outputs a drive pulse of the vertical transfer system and the horizontal pulse drive unit that outputs a drive pulse of the horizontal transfer system, as the power supply for the vertical pulse drive unit and the solid-state imaging device, one that outputs the first electrical potential in the first direction with respect to the reference potential and corresponding to a first polarity, and the second electrical potential in the second direction opposite to the first direction with respect to the reference potential is used. Then, at the start of the power supply, it is favorable to start the second electrical potential after starting the first electrical potential.

On the other hand, at the interruption of the power supply to the solid-state imaging device, it is favorable to interrupt the solid-state imaging device in the reverse order to the start of the power supply. To be specific, at the interruption of the power supply to the solid-state imaging device, it is favorable to interrupt the potential point after interrupting the power supply. Further, as the power supply for the vertical pulse drive unit and the solid-state imaging device, one that outputs the first electrical potential in the first direction with respect to the reference potential and corresponding to a first polarity, and the second electrical potential in the second direction opposite to the first direction with respect to the reference potential is used. At the interruption of power supply, it is favorable to interrupt the first electrical potential after interrupting the second electrical potential. When the pulse drive unit includes the vertical pulse drive unit that outputs a drive pulse of the vertical transfer system and a horizontal pulse drive unit that outputs a drive pulse of the horizontal transfer system, it is favorable to perform the interruption at the interruption of the power supply to the vertical pulse drive unit and the solid-state imaging device in a reverse order to the start of power supply. To be specific, at the interruption of the power supply to the vertical pulse drive unit and the solid-state imaging device, it is favorable to interrupt the potential point after interrupting the power supply. Further, as the power supply for the vertical pulse drive unit and the solid-state imaging device, one that outputs the first electrical potential in the first direction with respect to the reference potential and corresponding to a first polarity, and the second electrical potential in the second direction opposite to the first direction with respect to the reference potential is used. At the interruption of the power supply, it is favorable to interrupt the first electrical potential after interrupting the second electrical potential.

As a specific connection destination of the potential point, the following power supply can be employed, for example. For example, it is favorable to connect a predetermined potential point to a power supply for the horizontal pulse drive unit or a power supply for an output part that outputs an imaging signal of the solid-state imaging device. In any case, a power supply for the horizontal pulse drive unit or the solid-state imaging device in the vicinity of the protection device is used. Therefore, there is no inconvenience of arrangement of wiring. Further, it may be configured such that these power supplies can be arbitrarily selected. In this case, an optimal power supply is selected according to circumstances and can be used as the power supply for the potential point. The configuration of switching and using the power supplies in the pulse drive unit can be easily realized.

Alternatively, the potential point may be connected to a power supply for a function part other than for the solid-state imaging device and the pulse drive unit. This case provides more options of selection of the voltage value, the start order, and the interruption order. Even in this case, it may be configured such that the power supplies can be arbitrarily selected. The problem of arrangement of wiring may occur, an optimal power supply is selected according to circumstances and can be used as the power supply for the potential point.

In the imaging device and the protection device of a solid-state imaging device disclosed in the present specification, favorably, a substrate voltage control circuit that applies a predetermined potential to the voltage terminal is provided. It may be configured to apply the predetermined potential to the voltage terminal through an output circuit using a diode or an emitter (or source) follower circuit as needed. The emitter follower circuit or the source follower circuit is used when a high-input impedance and a low-output impedance are realized. In that sense, these circuits can be considered as the substrate voltage control circuit (in a broad sense) including the output circuit. That is, when an input impedance connected to the substrate potential control circuit is increased and an output impedance is decreased, or when either of the cases, the emitter follower circuit or the source follower circuit is used. That is, the form of the output circuit depends on the configuration of the substrate potential control circuit and is not determined by the output circuit alone. Here, an arrangement place of the substrate voltage control circuit (or the output circuit) may be within any of the solid-state imaging device, the pulse drive unit, and an outside of the solid-state imaging device and the pulse drive unit. When within the solid-state imaging device or the pulse drive unit, the number of peripheral members can be small, and the scale can be reduced.

In the imaging device and the protection device of a solid-state imaging device disclosed in the present specification, a capacitor connected to a resistor element in parallel may be provided in the protection unit as needed (to be specific, for a measure against a parasitic capacitance between a shutter terminal of the pulse drive unit and the substrate voltage terminal of the solid-state imaging device.

<Reference Configurations>

Next, several reference configurations will be described for easy understanding of a technology disclosed in the present specification. Note that, hereinafter, an electronic shutter drive pulse will be described as an example. However, in relation to other drive pulses, a protection technology disclosed in the present specification can be similarly applied depending on a supply circuit of a drive pulse. As the solid-state imaging device, one having a following configuration is used. A second polarity (for example, p type) semiconductor layer (p layer, a second conductivity type region) is grounded, which is opposite to a first polarity formed on a principal surface of a first polarity (for example, n type) semiconductor substrate (a first conductivity type region), and a pulse of a predetermined voltage is applied to the first polarity semiconductor substrate as an electronic shutter pulse, whereby an unnecessary electric charge stored in an electric charge storage part is swept to the first polarity semiconductor substrate according to the applied voltage. Typically, a CCD is applicable, and hereinafter, description will be given using a CCD.

[Reference Configuration 1]

FIG. 1 is a diagram (circuit configuration diagram) describing an imaging device 1W and a protection device 400W of Reference Configuration 1. The imaging device 1W includes a solid-state imaging device 10, a vertical driver 42V, a drive power supply 46 (local power supply), and a protection device 400W (protection unit). From the drive power supply 46, a first electrical potential $V_H$ (a positive power supply, for example, about 13 to 15 V) in a first direction (plus direction) with respect to a reference potential $V_M$ (ground potential) and a second electrical potential $V_L$ (a negative power supply, for example, about −6.5 to −8 V) in a second direction (minus direction) are supplied to the solid-state imaging device 10, the vertical driver 42V, and the like as power supply voltages. The reason why the first electrical potential $V_H$ is the positive power supply is that a substrate of the solid-state imaging device 10 is an n type.

Vertical transfer clocks V1 to Vv as drive pulses of the vertical transfer system and an electronic shutter pulse SHT for the electronic shutter function are supplied from the timing signal generation part (not illustrated) to the vertical driver 42V and a drive pulse of the horizontal transfer system is also supplied (not illustrated). The vertical driver 42V converts pulse signals into a necessary level and supplies the signal to the solid-state imaging device 10 as drive pulses (vertical drive pulses ΦV_1 to ΦV_v, an electronic shutter drive pulse ΦSHT, and the like). Here, the electronic shutter drive pulse ΦSHT is output from a shutter terminal SUB of the vertical driver 42V, and is supplied to a substrate voltage terminal φSUB of the solid-state imaging device 10 through the protection device 400W. A substrate voltage control circuit 402 and an output circuit 403 configured from a diode, a transistor, and the like are incorporated in the solid-state imaging device 10, and a constant voltage (pulse voltage) is provided through the output circuit 403, for example. The drawing illustrates a case of an emitter follower circuit using a bipolar transistor 404 as the output circuit 403. A source follower circuit using a metal-oxide-semiconductor field-effect transistor (MOSFET) may be employed in place of the bipolar type. The bipolar transistor 404 is always on between a base and an emitter in a forward direction at the usual operation, and supplies the constant voltage from the substrate voltage control circuit 402 to the substrate voltage terminal φSUB. Note that, when using the bipolar transistor 404, there is a decrease in voltage by the voltage between a base and an emitter Vbe.

The protection device 400W includes a first clamp circuit 410W (pre-clamp circuit) configured from a capacitor 412, a diode 414, and a resistor element 416 and a second clamp circuit 420W (main clamp circuit) configured from a capacitor 422, a diode 424, and a resistor element 426. One end of the capacitor 412 is connected to a shutter terminal SUB, and the other end is connected to a connection point (to be described as node ND410) of a cathode end of the diode 414, one end of the resistor element 416, and one end of the capacitor 422. The other end of the capacitor 422 is connected to a cathode end of the diode 424, one end of the resistor element 426, and a substrate voltage terminal φSUB. An anode end of the diode 414, the resistor element 416, an anode end of the diode 424, and the other end of the resistor element 426 is connected to a reference potential $V_M$ (in this example, to the ground).

As the diode 424, a diode that satisfies $VF<VL_{min}$ ($-VF>-VL_{min}$), for example, a Schottky diode or the like is used where an absolute value of a forward drop voltage of the diode 424 (to be specific, a maximum value thereof) is VF and a lower limit absolute value of an absolute maximum rating of a potential of the substrate voltage terminal φSUB is $VL_{min}$. In the imaging device 1 that uses an electronic shutter, it is necessary to select a diode that satisfies $Vr>Ves+V_{max}$ where a reverse blocking voltage of the diode 424 is Vr, the amplitude of the electronic shutter drive pulse ΦSHT is Ves, and a maximum value of the substrate voltage terminal φSUB at a steady state (during the electronic shutter is not operated) is $V_{max}$. That is, at an operation of the electronic shutter, a reverse voltage of a maximum $Ves+V_{max}$ is applied to the diode 424. Therefore, the reverse blocking voltage Vr of the diode 424 needs to be larger than the voltage $Ves+V_{max}$.

A rating is determined for the terminal potential of the substrate voltage terminal φSUB of the solid-state imaging device 10 in the specification. For example, the terminal potential may be determined by an absolute maximum rating. Here, depending on the drive power supply 46, if the protection device 400W is not used, a negative voltage may be generated from the shutter terminal SUB of the vertical driver 42V at the ON/OFF of the power supply, and a negative voltage falling below the rated voltage may be applied to the substrate voltage terminal φSUB due to the negative voltage. That is, when the second electrical potential $V_L$ is started up prior to the first electrical potential $V_H$, a negative voltage is generated from the shutter terminal SUB of the vertical driver 42V, and the negative voltage is applied to the substrate voltage terminal φSUB of the solid-state imaging device 10 by the time when the first electrical potential $V_H$ rises. Therefore, the potential of the substrate voltage terminal φSUB falls below the rated voltage.

In contrast, when the electronic shutter drive pulse ΦSHT is supplied through the protection device 400W, it is prevented by the two-stage first clamp circuit 410W and second clamp circuit 420W that a negative voltage that falls below the rating is provided to the substrate voltage terminal φSUB from the shutter terminal SUB at power-on. For example, when a power supply switch (not illustrated) of the imaging device 1W is turned ON, the drive power supply 46 is activated, the second electrical potential $V_L$ is first started, and then the first electrical potential $V_H$ is started. Therefore, a negative voltage is first output from the shutter terminal SUB of the vertical driver 42V. At this time, the diode 414 connected between the node ND410 and the reference potential $V_M$ is biased in a forward direction by the negative voltage. Therefore, the diode 414 is turned ON and the potential of the node ND410 is lower than the reference potential $V_M$ by a forward drop voltage (VF) of the diode 414. Then, a potential change at this time is transmitted to the substrate voltage terminal φSUB through the capacitor 422. At this time, since the first electrical potential $V_H$ has not applied yet, a negative voltage is applied to the substrate voltage terminal φSUB of the solid-state imaging device 10. However, since the diode 424 connected between the substrate voltage terminal φSUB and the reference potential $V_M$ is biased in the forward direction by the negative voltage, the diode 424 is turned ON, and the potential of the substrate voltage terminal φSUB is lower than the reference potential $V_M$ by the forward drop voltage (VF) of the diode 424. Since the forward drop voltage VF of the diode 424 satisfies $VF<VL_{min}$($-VF>-VL_{min}$), a large negative voltage that falls below a lower limit voltage $-VL_{min}$ is prevented from being applied to the substrate voltage terminal φSUB of the solid-state imaging device 10. A decrease of the substrate voltage terminal φSUB falling below a lower limit can be prevented by the forward drop voltage of the diode 424. Further, when the power supply switch is turned OFF, the first electrical potential $V_H$ falls sooner than the second electrical potential $V_L$, and thus a negative voltage may be applied to the substrate voltage terminal φSUB of the solid-state imaging device 10 similarly to the ON of the power supply switch. Even in this case, a large negative voltage falling below the lower limit voltage $-VL_{min}$ is prevented from being applied to the substrate voltage terminal φSUB by the action of the diode 424.

In such a protection device 400W, by causing the connection destination of the anode ends of the diode 414 and the diode 424 to be the reference potential $V_M$, the diode 414 and the diode 424 are usually turned OFF, and a problem of power consumption does not occur. Note that it can be considered to employ only the first clamp circuit 410W. In that case, the connection destination of the anode end of the diode 414 is the reference potential $V_M$, and therefore, the protection function cannot be maintained. Therefore, the second clamp circuit 420W is provided. However, in the protection device 400W, the number of components is six and the scale is large, and there is a difficulty that a special and expensive diode that satisfies $VF<VL_{min}$($-VF>-VL_{min}$) described above need to be selected as the diode 424.

[Reference Configuration 2]

Figure 2:
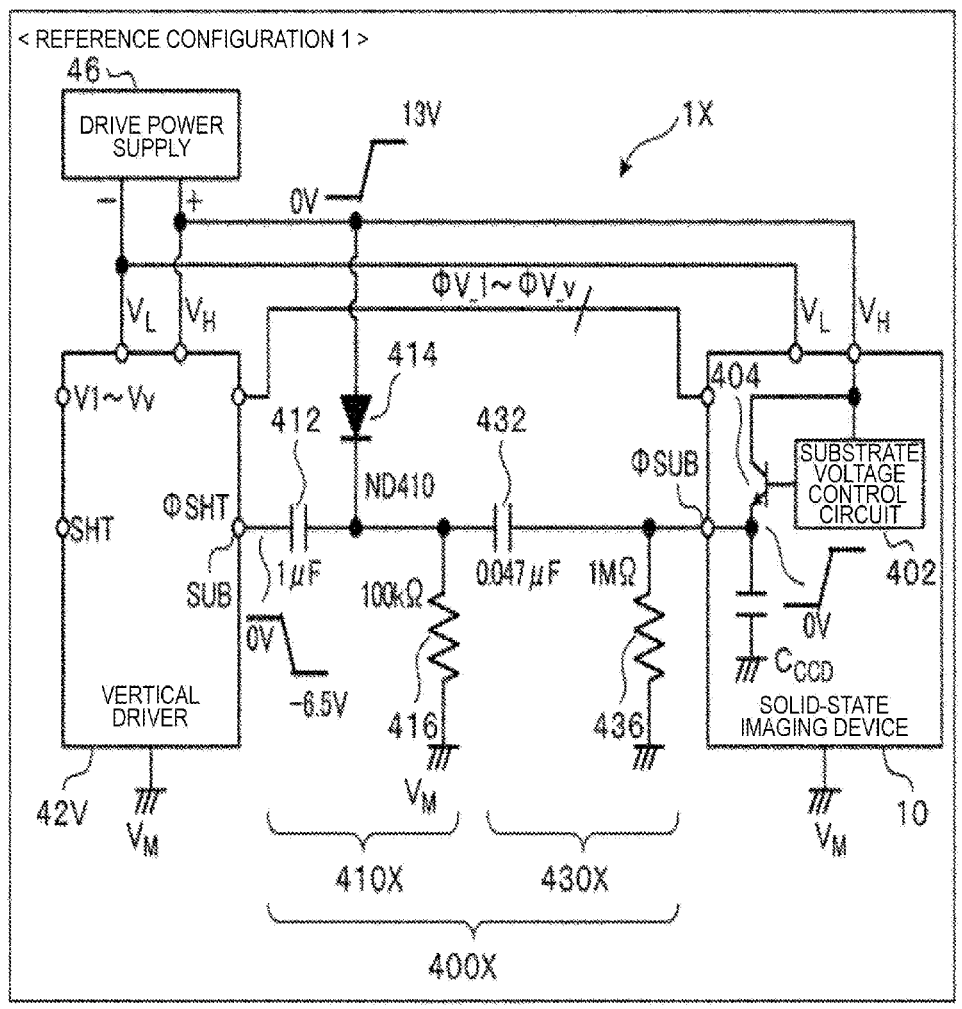
FIG. 2 is a diagram (circuit configuration diagram) describing an imaging device and a protection device of a reference configuration.
Figure 3:
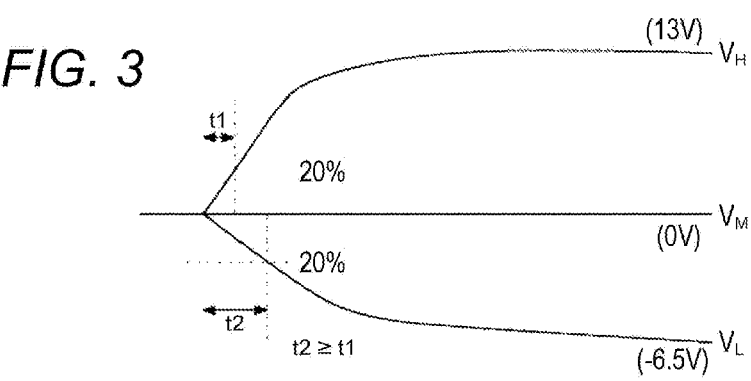
FIG. 3 is a diagram describing a start-up order of a first electrical potential (positive power supply) and a second electrical potential (negative power supply) required in a configuration illustrated in FIG. 2.

FIGS. 2 to 3 are diagrams describing an imaging device 1X and a protection device 400X of Reference Configuration 2. Here, FIG. 2 is a diagram illustrating a circuit configuration, and FIG. 3 is a diagram describing a start-up order of a first electrical potential $V_H$ and a second electrical potential $V_L$ at the start of a power supply, which is required in this configuration.

The protection device 400X of the imaging device 1X has a characteristic that, compared with the protection device 400W, a first clamp circuit 410X has a connection destination of an anode end of a diode 414 is a first electrical potential $V_H$ and removes a diode 424, thereby changing a second clamp circuit 420W to be a mere coupled circuit 430X (configured from a capacitor 432 and a resistor 436). A clamp circuit is only the first clamp circuit 410X, and thus hereinafter, the first clamp circuit 410X is described as clamp circuit 410X. In such a protection device 400X, the diode 424 is not used. Therefore, the number of components is reduced. Note that a capacity value of the capacitor 412 (capacitance) is 1 microfarad (μF), for example, and a resistance value of the resistor element 416 is 100 kilo-ohm (kΩ). A capacity value of the capacitor 422 is 0.047 microfarads (μF), for example, and a resistance value of the resistor element 426 is 1 megohm (MΩ), for example. The capacitor 412 needs a relatively large component because of its capacity value, and the capacitor 422 also needs a relatively large component because of its capacity value. For example, it is difficult to select an ultra-small ceramic capacitor having a so-called 0603 size or less, and it is necessary to select a film capacitor or a small ceramic capacitor or the like having a so-called 1005 size or more.

In the protection device 400X, an electronic shutter drive pulse ΦSHT (sweep pulse) is applied to a substrate voltage terminal φSUB from a shutter terminal SUB of a vertical driver 42V through the capacitor 412 and the capacitor 432. The diode 414 and the resistor element 416 existing between the capacitor 412 and the capacitor 432 protects the solid-state imaging device 10 from deterioration or breakage due to application of a minus voltage to an n-type substrate of the solid-state imaging device 10. Since a DC voltage in the clamp circuit 410X is different from the shutter terminal SUB of the vertical driver 42V and the substrate voltage terminal φSUB of the solid-state imaging device 10, the DC component is removed by providing the two capacitors: the capacitor 412 and the capacitor 432. The resistor 436 is a resistor used for clamping an output of the substrate voltage terminal φSUB of the solid-state imaging device 10.

In the protection device 400X of Reference Configuration 2, the output of the shutter terminal SUB (electronic shutter drive pulse ΦSHT) is clamped in the first electrical potential $V_H$, and is then input to the substrate voltage terminal φSUB of the solid-state imaging device 10. Therefore, the n-type substrate can be protected from the minus voltage at power-on. Note that, to realize such a protection function, the start-up order of the first electrical potential $V_H$ and the second electrical potential $V_L$ at the start of a power supply is required such that the second electrical potential $V_L$ rises after the first electrical potential $V_H$ rises, as illustrated in FIG. 3. For example, FIG. 3 is defined at a time of 20 percents (%), and it is necessary to satisfy t2≥t1 where a period until the first electrical potential $V_H$ rises to the 20 percent (%) point is t1 and a period until the second electrical potential $V_L$ rises to the 20 percent (%) point is t2.

Such a protection device 400X of Reference Configuration 2 can protect the n-type substrate from the minus voltage at power-on. On the other hand, there are problems: 1) the number of components, 2) the size of components, 3) power consumption (for example, about 1.6 milliwatts), 4) selection of the diode, 5) transition (modulation) time. Although 1) has been improved compared with the protection device 400W, 1) is a problem that only the coupled circuit 430 is not sufficient and the number of components of the first clamp circuit 410 that is an external component is increased to three (the capacitor 412, the diode 414, and the resistor element 416) in order to realize the protection function. 2) is a problem that the size of components becomes larger. That is, in the protection device 400X, an input voltage is divided by the capacitor 412, the capacitor 432, and a substrate capacity $C_{ccd}$ of the solid-state imaging device 10, and the amplitude of an input pulse is attenuated. Therefore, the capacitor 412 and the capacitor 432 need large capacity values so that the amplitude of an input pulse is not attenuated compared with the minimum amplitude of a pulse written in the specification of the solid-state imaging device 10. In addition, these components require, for example, high-pressure resistance (for example, pressure resistance of 25 V or more). This is because an electronic shutter drive pulse ΦSHT having a large amplitude (for example, about 20 V) is applied to the capacitor 412 and the capacitor 432. From the above, the capacity values of the capacitor 412 and the capacitor 432 required for the protection device 400X have a problem that the size of components become larger because not only large capacity but also high-pressure resistance is required.

3) is a problem caused by a need of current on a steady basis. This is because the clamp circuit 410X applies a forward bias and causes the diode 414 to perform clamping. 4) is a problem related to selection of the diode 414. That is, in the protection device 400X, an AC signal subjected to a reverse bias is applied to the diode 414 subjected to a forward bias, and therefore a diode having a fast reverse recovery time needs to be selected. Although it may not be such a special diode compared with the diode 424 in the protection device 400W, it is necessary to select a special and expensive diode compared with the diode 414.

5) is a problem that a transition time required for substrate voltage control of the solid-state imaging device 10 relatively becomes longer, which is caused by DC removal (DC cut) in twice because the capacitor 412 and the capacitor 422 are used as members provided between the vertical driver 42V and the solid-state imaging device 10 and serving a removal function of a DC component. The transition time is proportional to a product of a capacity value $C_{412}$ of the capacitor 412 and a resistance value $R_{416}$ of the resistor element 416. Note that, when the DC removal occurs twice (by the capacitor 412 and the capacitor 432), a time constant (for example, capacity value $C_{412}$) needs to become larger, and the transition time becomes longer than that of one time. For example, in a case of the illustrated constant, the transition time required for substrate voltage control of the solid-state imaging device 10 is about 25 milliseconds.

[Reference Configuration 3]

Figure 4:
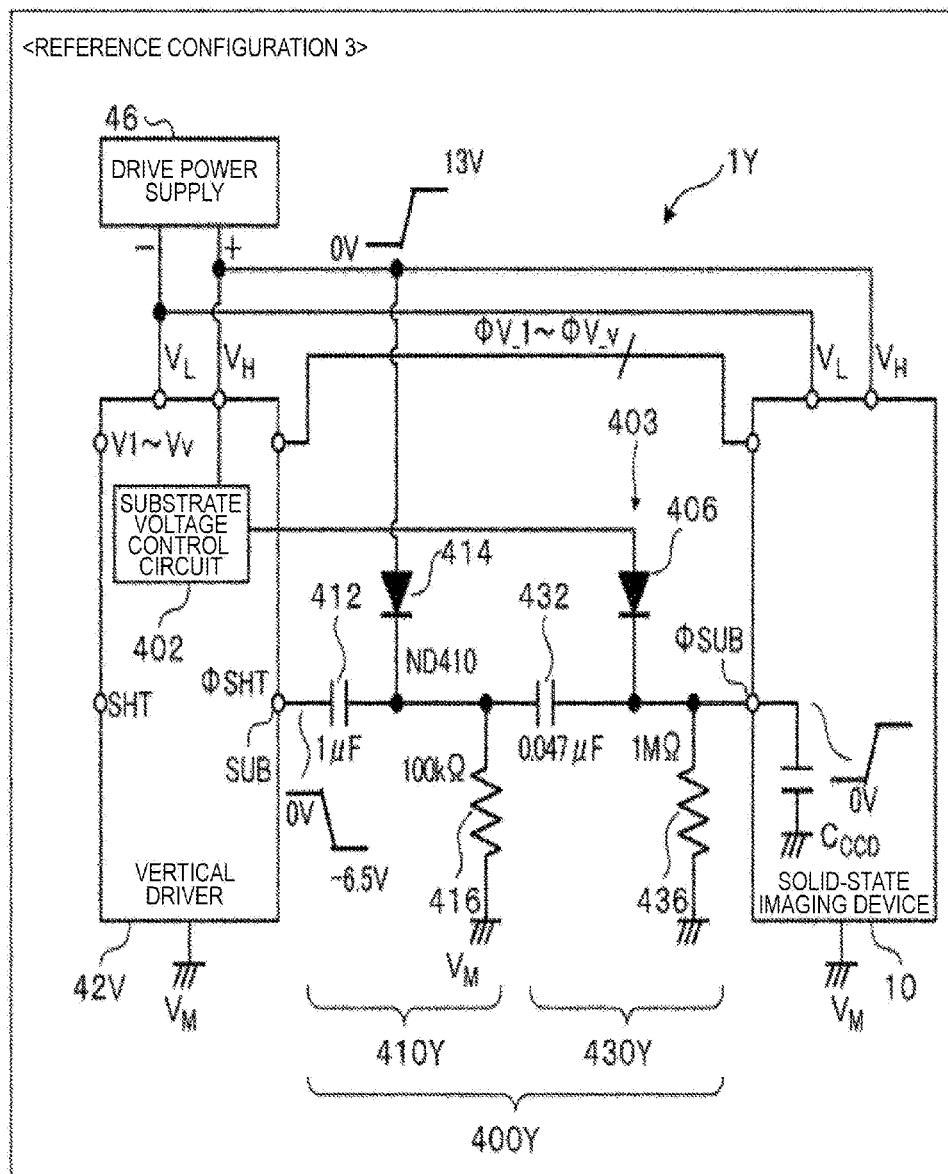
FIG. 4 is a diagram (circuit configuration diagram) describing an imaging device and a protection device of Reference Configuration 3.

FIG. 4 is a diagram (circuit configuration diagram) describing an imaging device 1Y and a protection device 400Y of Reference Configuration 3. The imaging device 1Y has a characteristic that a substrate voltage control circuit 402 is implemented in a vertical driver 42V instead of in a solid-state imaging device 10, and a diode 406 is used as an output circuit 403 in place of a transistor 404 and is arranged outside the driver 42. Others are similar to Reference Configuration 2. Actually, the protection device 400Y of Reference Configuration 3 is the same as the protection device 400X of Reference Configuration 2, and has a similar problem to the protection device 400X. The diode 406 is always on in a forward direction at a usual operation, and supplies a constant voltage from the substrate voltage control circuit 402 to a substrate voltage terminal φSUB. Note that, when the diode 406 is used as the output circuit 403, there is a decrease in voltage by the forward drop voltage. Although it is not a problem of the protection device 400Y itself, the diode 406 exists outside the vertical driver 42V and the solid-state imaging device 10 in terms of the circuit configuration. Therefore, an increase in the number of components becomes a problem in view of the configuration members between the vertical driver 42V and the solid-state imaging device 10 as a whole.

[Reference Configuration 4]

Figure 5:
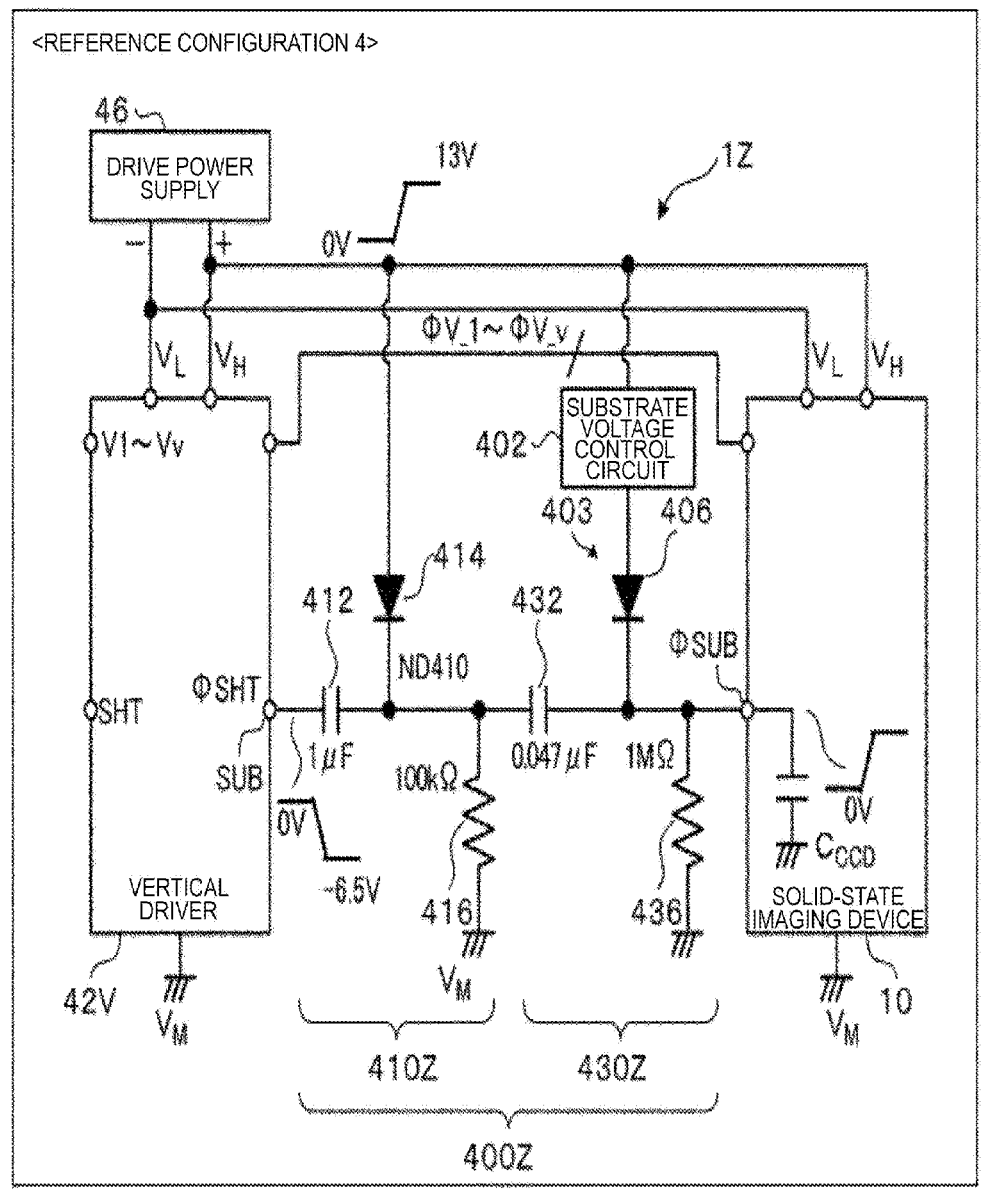
FIG. 5 is a diagram (circuit configuration diagram) describing an imaging device and a protection device of Reference Configuration 4.

FIG. 5 is a diagram (circuit configuration diagram) describing an imaging device 1Z and a protection device 400Z of Reference Configuration 4. Reference Configuration 4 further modifies Reference Configuration 3 such that a substrate voltage control circuit 402 is not incorporated in a solid-state imaging device 10 or in a vertical driver 42V, and is arranged outside the solid-state imaging device 10 and the vertical driver 42V. Others are similar to Reference Configuration 3. Actually, the protection device 400Z of Reference Configuration 4 is similar to the protection device 400X of Reference Configuration 2, and has a similar problem to the protection device 400X. In the case of Reference Configuration 4, although it is not a problem of the protection device 400Z itself, the substrate voltage control circuit 402 exists outside the vertical driver 42V and the solid-state imaging device 10 in terms of the circuit configuration. Therefore, an increase in the number of components of the substrate voltage control circuit 402 and an increase in scale of the circuit become problems in view of the configuration members between the vertical driver 42V and the solid-state imaging device 10 as a whole.

[Summary of Reference Configurations]

As described above, the reference configurations 1 to 4 still have issues to be solved in terms of the number of elements, selection of components, and the like. Therefore, the present embodiment proposes a new protection device 400 that can further decrease the number of elements and reduce restriction on selection of components.

<Basic Principle of Element Protection>

Figure 6:
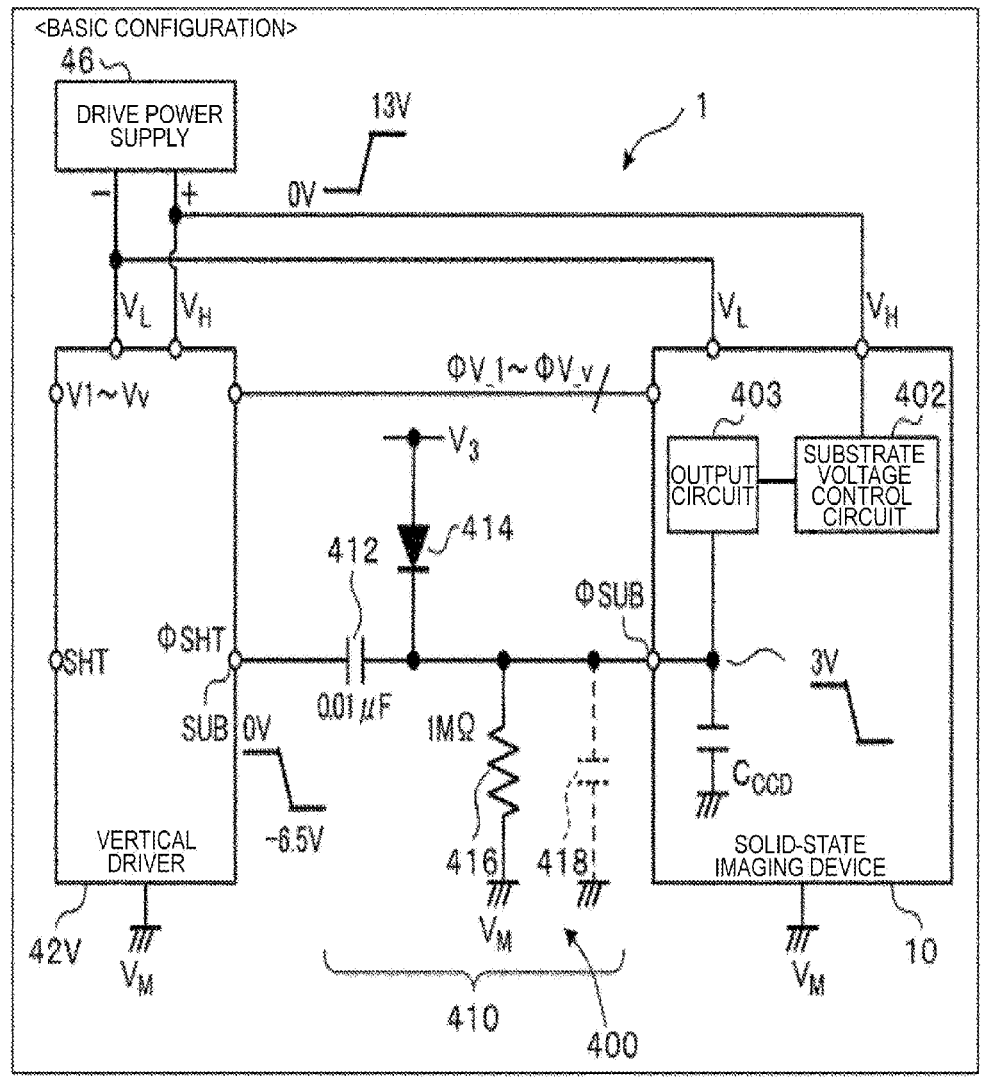
FIG. 6 is a diagram (circuit configuration diagram) describing a basic principle of an element protection of an imaging device and a protection device of the present embodiment of FIG. 6.
Figure 7:
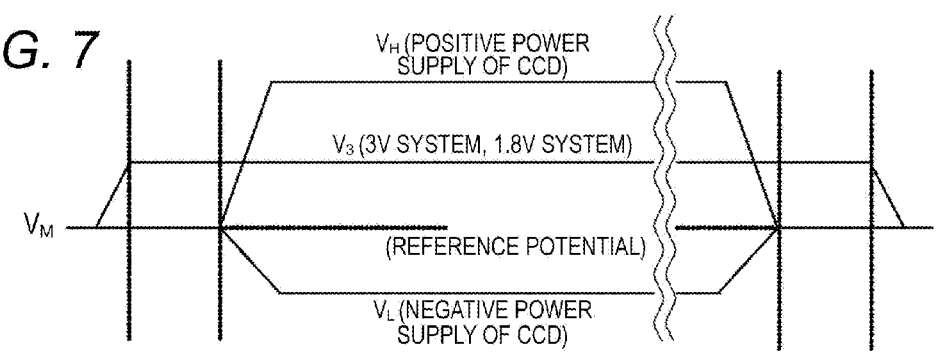
FIG. 7 is a diagram describing a start-up order at the start and a lowering-down order at the interruption of a first electrical potential (positive power supply) and a second electrical potential (negative power supply) required in a configuration illustrated in FIG. 6.

FIGS. 6 and 7 are diagrams describing a basic configuration of a protection device 400 of the present embodiment and the principle that prevents application of an abnormal voltage to a substrate voltage terminal φSUB of a solid-state imaging device 10 in the protection device 400. Here, FIG. 6 illustrates circuit configuration diagrams of an imaging device 1 and the protection device 400 of the present embodiment and FIG. 7 is a diagram describing a start-up order at the start of a power supply and a lowering-down order at the interruption of a power supply of a first electrical potential $V_H$, a second electrical potential $V_L$, and a third electrical potential $V_3$ required for the configuration.

[Configuration]

First, a voltage difference between an input and an output of the output circuit 403 (a difference between a potential of an output terminal of the substrate voltage control circuit 402 and a potential of the substrate voltage terminal φSUB) is caused to be ΔV403. As the output circuit 403, as described above, an emitter follower circuit using a bipolar transistor 404, a circuit using the diode 406, or a source follower circuit using a MOS-type FET can be employed. Since the substrate voltage needs to be stable, it is common to interpose an output circuit of an emitter follower circuit or a source follower circuit that performs impedance conversion of an output of the substrate control circuit 402. When an output impedance of the substrate control circuit is sufficiently low, the diode 406 can be used. The voltage difference ΔV403 when the bipolar transistor 404 is used is a voltage between a base and an emitter Vbe of the bipolar transistor 404, the voltage difference ΔV403 when the diode 406 is used is a forward drop voltage of the diode 406, and the voltage difference ΔV403 when the MOS-type FET is used is a voltage difference by the source follower circuit.

The protection device 400 of the imaging device 1 has a characteristic that, compared with the protection device 400W, a clamp circuit 410 (corresponding to the first clamp circuit 410X) uses a connection destination of an anode end of a diode 414 as a power supply of a third electrical potential $V_3$, and a second clamp circuit 420W is removed. The clamp circuit has an one-stage configuration, and there is no coupled circuit 430. The diode 414 may have a configuration of a diode-connected transistor. In such a protection device 400, a second clamp circuit 420 and a coupled circuit 430 are not used, and thus the number of components can be reduced. The capacitor 412 serves the function of the coupled circuit 430 for absorbing a voltage difference between the shutter terminal SUB and the substrate voltage terminal φSUB (removing a DC component). A capacity value of the capacitor 412 is, for example, 0.01 microfarads (μF), and a resistance value of the resistor element 416 is, for example, 1 megohm (MΩ). Note that the diode 414 and the resistor element 416 are explicitly arranged outside the solid-state imaging device 10. However, a configuration in which they are arranged inside the solid-state imaging device 10 may be employed. In the present disclosure, "a diode connected between a potential point (a potential point of the third electrical potential $V_3$) and a voltage terminal (for example, the substrate voltage terminal φSUB)" is not limited to the diode 414 explicitly illustrated outside the solid-state imaging device 10, and includes a diode arranged inside the solid-state imaging device 10. In the present disclosure, "a resistor element connected between a voltage terminal (for example, the substrate voltage terminal φSUB) and a potential point (for example, a reference potential $V_M$)" is not limited to the resistor element 416 explicitly illustrated outside the solid-state imaging device 10, and includes a resistor element arranged inside the solid-state imaging device 10. The capacity value of the capacitor 412 can be smaller than any of the above-described Reference Configurations 1 to 4. The resistor element 416 functions as a discharge resistor.

Note that, depending on the solid-state imaging device 10, as illustrated by a broken line in the drawing, a capacitor 418 (the capacity value is, for example, about 1000 to 4700 picofarads (pF)) may be provided in parallel with the resistor element 416. The capacitor 418 is provided as a so-called decoupling capacitor, and reduces the influence of a vertical transfer clock, a horizontal transfer clock, and the like, for example. When capacitive coupling of a transfer clock and the substrate voltage terminal φSUB in the imaging device is large or rising/falling of a clock is sharp, a decoupling capacitor is required.

Here, the third electrical potential $V_3$ is set to a predetermined potential that is a potential between the reference potential $V_M$ and the first electrical potential $V_H$, and corresponds to a maximum rated voltage of the substrate voltage terminal φSUB of the solid-state imaging device 10. To be specific, the following condition is satisfied. First, as for a relationship between the third electrical potential $V_3$ and a predetermined potential corresponding to a rated voltage (favorably, a maximum rated voltage) of the substrate voltage terminal φSUB, the third electrical potential $V_3$ that satisfies a lower limit of "$V_3$–VF>–$V_L$" and an upper limit of "$V_3$–VF<a minimum value of the substrate voltage terminal φSUB" is selected (for example, the 1.8V system or the 3V system is used) where an absolute value of a forward drop voltage of the diode 414 is VF, and a minimum voltage (that is favorably a minimum value when variations are included) output by "the substrate voltage control circuit 402+the output circuit 403" to the substrate voltage terminal φSUB is $V_L$. This condition is described as a rated voltage condition of the third electrical potential $V_3$. It is favorable to satisfy the voltage condition even when variations are taken into account. To be specific, it is favorable to satisfy the lower limit of "$V_{3max}$–$Vf_{min}$>–$VL_{min}$" where a maximum value of the third electrical potential $V_3$ is $V_{3max}$, a lower limit of a forward drop voltage of the diode 414 (a minimum value of a forward drop voltage in the diode 414) is $VF_{min}$, and a lower limit of an absolute value of an absolute maximum rating of a potential of the substrate voltage terminal φSUB (a minimum voltage of the substrate voltage terminal φSUB, that is, a minimum allowable voltage) is $VL_{min}$. This condition is described as a maximum allowable condition of the third electrical potential $V_3$.

Note that the maximum allowable condition is defined by taking the minimum values of both of the forward drop voltage of the diode 414 and the rated voltage (allowable voltage) of the substrate voltage terminal φSUB. However, one of them may be defined as the rated value. In this case, compared with the maximum allowable condition, there is a possibility of having the influence on a usual operation depending on variations. This is because the diode 414 connected to the substrate voltage terminal φSUB may be turned ON at a usual operation. In contrast, the above-described maximum allowable condition indicates a condition in which the diode 414 is not turned ON in the forward direction, and even if there are variations and the like, the diode 424 connected to the substrate voltage terminal φSUB can be avoided from being turned ON at the usual operation. As a result, the influence on the usual operation can be reliably prevented without depending on the variation and the like, and the solid-state imaging device 10 can be reliably protected from deterioration or breakage and the like at the start or the interruption of a power supply.

In the protection device 400 of the present embodiment, an output (electronic shutter drive pulse ΦSHT) of the shutter terminal SUB is input to the substrate voltage terminal φSUB of the solid-state imaging device 10 after clamping is performed in the third electrical potential $V_3$. Therefore, an n-type substrate can be protected from a minus voltage at power-on. Note that, to realize such a protection function, it is favorable that the start-up (start) order of the first electrical potential $V_H$, the second electrical potential $V_L$, and the third electrical potential $V_3$ at the start of a power supply satisfies the state illustrated in FIG. 7. That is, it is favorable that the third electrical potential $V_3$ rises (is started) before the first electrical potential $V_H$ and the second electrical potential $V_L$ rise (are started). This condition is described as a start condition of the third electrical potential $V_3$.

More favorably, as for the start-up order of the first electrical potential $V_H$ and the second electrical potential $V_L$ at the start of a power supply after the third electrical potential $V_3$ rises, it is favorable that the second electrical potential $V_L$ rises (is started) after the first electrical potential $V_H$ rises (is started), as illustrated in FIG. 7. This means that these electrical potentials may just be in the same state as FIG. 3, for example.

In addition, it is favorable that the lowering-down (interruption) order of the first electrical potential $V_H$, the second electrical potential $V_L$, and the third electrical potential $V_3$ at the interruption of a power supply satisfies the state illustrated in FIG. 7. That is, it is favorable that the third electrical potential $V_3$ falls (is interrupted) after the first electrical potential $V_H$ and the second electrical potential $V_L$ fall (are interrupted). This condition is described as a stop condition of the third electrical potential $V_3$.

More favorably, the lowering-down order of the first electrical potential $V_H$ and the second electrical potential $V_L$ at the interruption of a power supply before the third electrical potential $V_3$ falls (is interrupted) is favorably such that the first electrical potential $V_H$ falls (is interrupted) after the second electrical potential $V_L$ falls (is interrupted) as illustrated in FIG. 7. This means that these electrical potentials may just fall in the order opposite to the order at the start of a power supply illustrated in FIG. 3, for example. For example, as illustrated in FIG. 3, in a case where it is defined at a time of the 20 percents (%) point, it is favorable to satisfy t3≥t4 where a period from when the second electrical potential $V_L$ falls from the 20 percent (%) point to when the second electrical potential $V_L$ stops (reaches nearly 0 percent (%) point) is t3 and a period from when the first electrical potential $V_H$ falls from the 20 percent (%) point to when the first electrical potential $V_H$ stops is t4.

That is, when considering both of the start of a power supply and the interruption of a power supply, a power supply supplying the third electrical potential $V_3$ is required, which rises before the first electrical potential $V_H$ (positive power supply) and the second electrical potential $V_L$ (negative power supply) of the solid-state imaging device 10 at power-on, and falls after the power supply of the solid-state imaging device 10 falls at the interruption of the power supply.

[Operation]

An operation of the protection device 400 of the imaging device 1 of the present embodiment will be described. Hereinafter, the third electrical potential $V_3$ is supplied from a power supply in which the voltage value satisfies the maximum allowable condition ($V_{3max}$>−$VL_{min}$+$VF_{min}$), and which rises before the power supplies of the solid-state imaging device 10 and the vertical driver 42V (the first electrical potential $V_H$ and the second electrical potential $V_L$) rise at the start of the power supplies, and falls after the power supplies of the solid-state imaging device 10 and the vertical driver 42V fall at the interruption of the power supplies.

[Protection Operation at Start of Power Supply]

First, an operation at the start of a power supply will be described. As illustrated in FIG. 7, the third electrical potential $V_3$ is started before the power supplies to the solid-state imaging device 10 and the vertical driver 42V (for the first electrical potential $V_H$ and the second electrical potential $V_L$) rise. When the third electrical potential $V_3$ rises, a forward drop voltage is applied to the diode 414 and the diode 414 is turned ON, and the current flows. As a result, a voltage according to a current value flowing in the resistor element 416 from the diode 414 is generated in the substrate voltage terminal φSUB of the solid-state imaging device 10.

Next, the drive power supply 46 starts the first electrical potential $V_H$ and the second electrical potential $V_L$. When the power supplies are started, depending on a start-up timing or a through rate of the positive power supply for the first electrical potential $V_H$ and the negative power supply for the second electrical potential $V_L$, a minus voltage from the shutter terminal SUB of the vertical driver 42V may be gone through the substrate voltage terminal φSUB of the solid-state imaging device 10. Here, in the present embodiment, the protection device 400 is provided, and even if such a minus voltage is gone through the substrate voltage terminal φSUB, the diode 414 connected to the substrate voltage terminal φSUB responds and the protection function at the start of a power supply works. Therefore, the substrate voltage terminal φSUB can be prevented from being a minus voltage. By selecting the third electrical potential $V_3$ to satisfy the maximum allowable condition of the third electrical potential $V_3$, the protection function works even if there are variations in the forward drop voltage of the diode 414 or the absolute maximum rating of the potential of the substrate voltage terminal φSUB.

As a power supply voltage (the first electrical potential $V_H$) of the positive power supply is increased, an output voltage of the substrate voltage terminal φSUB is increased. When the voltage becomes larger than the voltage clamped by the diode 414, the diode 414 is turned OFF and does not allow the stationary current to flow. This means that the stationary current through the diode 414 does not occur in a usual operation state. Since the protection device 400 of the present embodiment does not need the stationary current, unlike Reference Configurations 2 to 4, the power consumption of the protection device 400 can be substantially (excluding the power consumption with which the protection function works) 0 milliwatt.

[Usual Operation]

Next, a usual operation will be described. An AC component of the electronic shutter drive pulse ΦSHT output from the shutter terminal SUB of the vertical driver 42V is input to the substrate voltage terminal φSUB of the solid-state imaging device 10 at the usual operation. At this time, the diode 414 is always subjected to a reverse bias and is OFF. A special and expensive diode such as the diode 424 in Reference Configuration 1 or the diode 414 in Reference Configurations 2 to 4 is not necessary. For example, the present embodiment is different from Reference Configurations 2 to 4 in which an AC signal subjected to a reverse bias is input to the diode 414 subjected to a forward bias and thus a diode having a fast reverse recovery time is necessary.

In the protection device 400 of the present embodiment, only a capacitor 412 is used as a member which serves a removal function of a DC component and is provided between the vertical driver 42V and the solid-state imaging device 10. Since the DC removal (DC cut) can be done only once, the capacity value of the capacitor 412 can be made smaller than that of Reference Configurations 1 to 4, and for example, an ultra-small ceramic capacitor such as a so-called 0603 size or less can be selected.

In addition, if the capacity value can be made small, the transition time required for substrate voltage control of the solid-state imaging device 10 can be reduced. This is because the transition time of the case in which the DC removal is only once (by only the capacitor 412) is proportional to a product of a capacity value $C_{412}$ of the capacitor 412 and a resistance value $R_{416}$ of the resistor element 416. For example, in a case of the illustrated constant, the transition time required for substrate voltage control of the solid-state imaging device 10 can be made about 2 milliseconds.

The reduction of the transition time is numerically described by comparison with Reference Configuration 2 as follows. In Reference Configuration 2, the DC removal is performed twice (by the capacitor 412 and the capacitor 422), and the transition time is roughly proportional to a product of the capacity value $C_{412}$ of the capacitor 412 and the resistance value $R_{416}$ of the resistor element 416 (=0.1 where a time constant is T1) and takes about 25 milliseconds (T3) as described above. In contrast, in the present embodiment, the DC removal is performed once (by the capacitor 412), and the transition time is roughly proportional to a product of the capacity value $C_{412}$ of the capacitor 412 and the resistance value $R_{416}$ of the resistor element 416 (=0.01 where a time constant is T2) and takes about 2 milliseconds (T4). A ratio between T1 (=0.1) of Reference Configuration 2 and T2 (=0.01) of the present embodiment is T1/T2=10, and this value approximates to a ratio T3/T4=12.5 of T3 (25 milliseconds) of Reference Configuration 2 and T4 (2 milliseconds) of the present embodiment. That is, according to the protection device 400 of the present embodiment, the transition time can be reduced by the decrease of the time constant T2 of the present embodiment with respect to the time constant T1 of Reference Configuration 2.

In the protection device 400 of the present embodiment, voltages applying to both ends of the capacitor 412 can be suppressed. This is because, while the capacitor 412 is connected to a clamp potential (for example, 12.6 V) of the diode 414 in Reference Configurations 2 to 4, the diode 412 is directly connected to the substrate voltage terminal φSUB of the solid-state imaging device 10 in the protection device 400 of the present embodiment. The voltage of the substrate voltage terminal φSUB is about 5 to 11 V although it differs depending on the solid-state imaging device 10 or an operation mode thereof. Therefore, the present embodiment can suppress a voltage between terminals that applies to the capacitor 412 compared with Reference Configurations 2 to 4.

[Operation at Interruption of Power Supply]

Next, an operation at the interruption of a power supply will be described. As illustrated in FIG. 7, the drive power supply 46 lowers down the power supplies (for the first electrical potential $V_H$ and the second electrical potential $V_L$) to the solid-state imaging device 10 and the vertical driver 42V before the third electrical potential $V_3$ falls. When the power supply voltages (the first electrical potential $V_H$ and the second electrical potential $V_L$) are lowered and the substrate voltage terminal φSUB becomes the forward drop voltage VF of the third electrical potential $V_3$–the diode 414 or less, the diode 414 is operated in the forward direction, and thus the current flows. As a result, a voltage according to the current value flowing in the resistor element 416 from the diode 414 is generated in the substrate voltage terminal φSUB of the solid-state imaging device 10. Therefore, the substrate voltage terminal φSUB is clamped to a constant voltage.

At the lowering-down of the positive power supply (for the first electrical potential $V_H$) and the negative power supply (for the second electrical potential $V_L$), similarly to the start-up, a minus voltage may be gone through the substrate voltage terminal φSUB of the solid-state imaging device 10 from the shutter terminal SUB of the vertical driver 42V depending on a lowering-down timing or a through rate. Here, in the present embodiment, the protection device 400 is provided, and even when such a minus voltage is gone through the substrate voltage terminal φSUB, the diode 414 connected to the substrate voltage terminal φSUB responds and the protection function at the interruption of a power supply works. Therefore, the substrate voltage terminal φSUB can be prevented from being a minus voltage. By selecting the third electrical potential $V_3$ to satisfy the maximum allowable condition of the third electrical potential $V_3$, the protection function at the interruption of a power supply works even if there are variations in the forward drop voltage of the diode 414 or the absolute maximum rating of the potential of the substrate voltage terminal φSUB.

The third electrical potential $V_3$ is lowered down after the positive power supply (for the first electrical potential $V_H$) and the negative power supply (for the second electrical potential $V_L$) fall. Accordingly, the diode 414 is turned OFF and stops the protection function.

[Summary of Function and Effect]

As described above, according to the protection device 400 of the present embodiment, the simple configuration with a small number of components can prevent an abnormal voltage (to be specific, a voltage in the second direction (minus direction) with respect to the reference potential $V_M$) from applying to the semiconductor substrate of the solid-state imaging device 10 such as a CCD at the start or the interruption of a power supply. The protection device 400 of the present embodiment uses only the capacitor 412 as a member that performs the DC removal between the vertical driver 42V and the solid-state imaging device 10, and thus the removal of DC components can be done only once. Therefore, the capacity value of the capacitor 412 can be made small, and a smaller component (for example, an ultra-small ceramic capacitor having a 0603 size, or the like) can be selected, and a transition time required for substrate voltage control of the solid-state imaging device 10 can be reduced. Further, according to the protection device 400 of the present embodiment, voltages of both ends of the capacitor 412 can be suppressed. Therefore, the protection device 400 reduces an influence of the DC bias dependency in the capacitor 412, and does not require a stationary current and thus does not require a special diode.

Example 1

Figure 8:
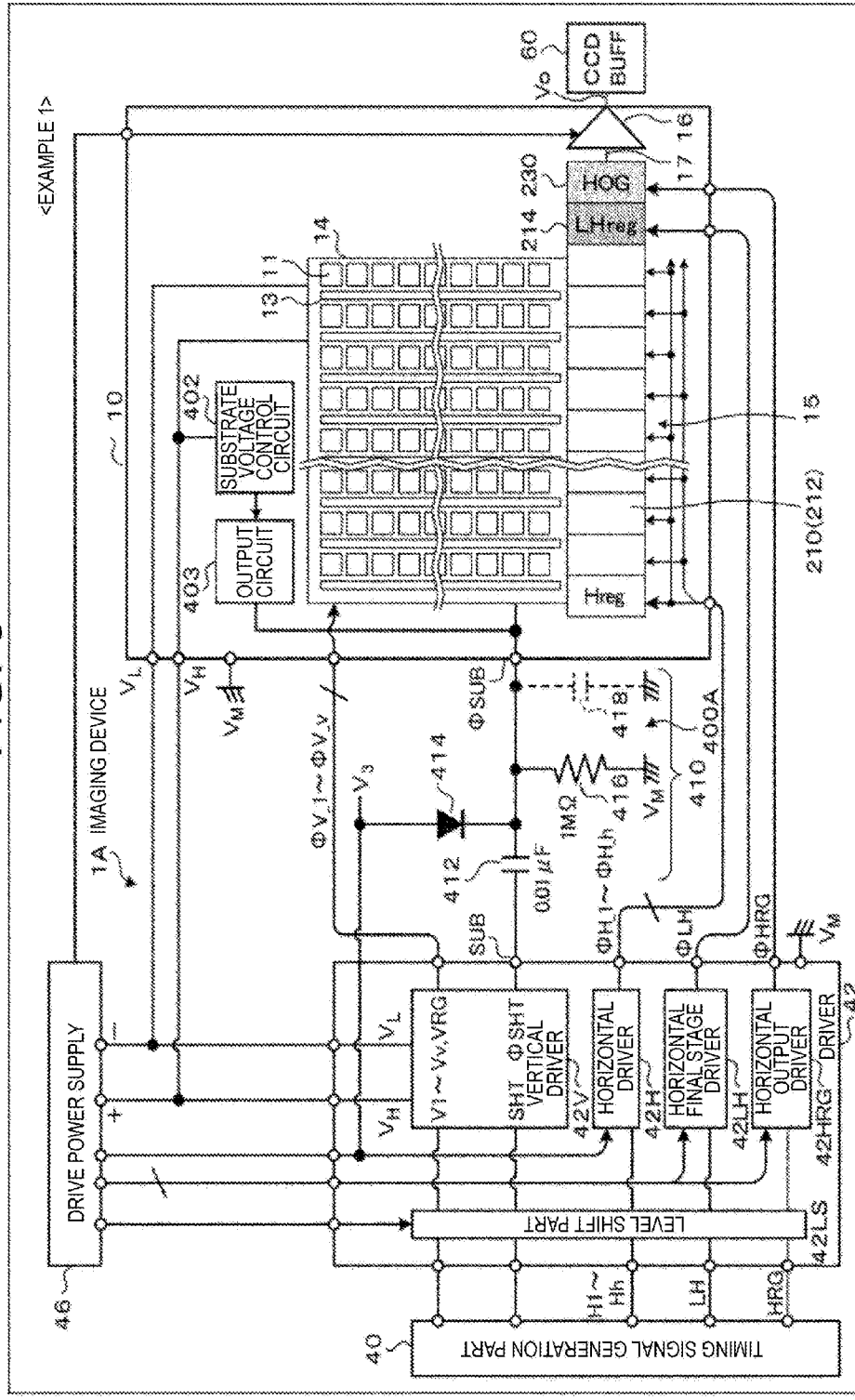
FIG. 8 is a diagram (circuit configuration diagram) describing an imaging device and a protection device of Example 1.

FIG. 8 is a diagram (circuit configuration diagram) describing an imaging device 1A and a protection device 400A of Example 1. Example 1 (the same applies to other examples described below) has a characteristic that a power supply supplied to a horizontal driver 42H is used as a power supply for a third electrical potential $V_3$. A different point from other examples described below is that a substrate voltage control circuit 402 and an output circuit 403 are provided in a solid-state imaging device 10. Example 1 employs a substrate voltage control circuit internal generation type that includes the substrate voltage control circuit 402 inside a device.

The imaging device 1A of Example 1 includes the solid-state imaging device 10, a timing signal generation part 40, a driver 42 (pulse drive unit), a drive power supply 46, and the protection device 400A (the above-described protection device 400 of the present embodiment). As described above, the protection device 400A is arranged between the driver 42 and the solid-state imaging device 10.

As the solid-state imaging device 10, for example, a CCD-type solid-state imaging device (IT-CCD) in an interline system in which a vertical electric charge transfer part is arrayed in an array of a sensor part (an array in the vertical direction) is driven with a V phase (for example, 4 phases). The CCD-type solid-state imaging device 10 includes, on a semiconductor substrate, an imaging area 14 (imaging part) in which a large number of sensor parts 11 (photosensitive parts, photo cells) made of a photodiode or the like that is an example of a light-receiving element corresponding to a pixel (unit cell) is arrayed in a vertical (column) direction and in a horizontal (row) direction in a two dimensional matrix manner. A vertical transfer part 13 (also referred to as a vertical CCD, a V register part, or a vertical electric charge transfer part) in which a plurality of vertical transfer electrodes corresponding to V-phase drive is provided in each vertical column of the sensor parts 11 is arrayed in the imaging area 14. Each vertical transfer electrode is formed such that several vertical transfer electrodes (for example, two) are corresponding to one sensor part 11, and is configured to drive and transfer the electric charge in the vertical direction by V types of vertical drive pulses $\Phi V$ ($\Phi V\_1$ to $\Phi V\_v$) supplied from the driver 42 and based on a vertical transfer clock. The transfer direction of the electric charge is the vertical (column) direction in the drawing, the vertical transfer part 13 is provided in the direction, and a plurality of vertical transfer electrodes is arranged in a direction (horizontal direction, row direction) perpendicular to the direction.

In the solid-state imaging device 10, a horizontal transfer part 15 in which a plurality of horizontal transfer registers 212 extends in a main transfer direction of the electric charge (from the right to left direction in the drawing) is provided adjacent to the vertical transfer part 13 of the last row that is an end part of transfer destinations of the plurality of vertical transfer parts 13. In the example illustrated in the drawing, the horizontal transfer registers 212 are arranged until a region exceeding the imaging area 14 (element part). The horizontal transfer part 15 includes a horizontal transfer path 210 in which a plurality of horizontal transfer registers 212 is arrayed in the transfer direction (may also be referred to as a horizontal CCD, an H register part, or a horizontal electric charge transfer part). In some cases, an excessive electric charge sweep part may be provided in the horizontal transfer path 210 on an opposite side to the vertical transfer parts 13 (imaging area 14). The horizontal transfer path 210 is not limited to one line, and a plurality of lines may be provided. In that case, the excessive electric charge sweep part is arranged to conform to the number of the horizontal transfer paths 210.

The horizontal transfer path 210 is driven and transferred by horizontal drive pulses $\Phi H$ ($\Phi H\_1$ to $\Phi H\_h$) based on horizontal transfer clocks of an h phase (for example, 2 phases or 4 phases), for example, and sequentially transfers the electric charges of one line moved from the plurality of vertical transfer parts 13 in the horizontal direction during a horizontal scanning period after a horizontal blanking period. Therefore, a plurality of horizontal transfer electrodes (for example, two) corresponding to the h-phase drive is provided. Note that the horizontal transfer register 212 at a final stage that is an end part of the transfer direction is described as final stage horizontal transfer register 214 (LHreg).

An electric charge/electrical signal conversion part 16 (CCD output circuit (output part)), which converts the electric charge horizontally transferred by the horizontal transfer part 15 into an electrical signal and outputs the signal as an analog imaging signal, is provided in the end part (final stage horizontal transfer register 214) that is a transfer destination of the horizontal transfer part 15. A dedicated power supply is supplied to the electric charge/electrical signal conversion part 16 from the drive power supply 46. A connection point with the final stage horizontal transfer register 214 of the electric charge/electrical signal conversion part 16 is referred to as electric charge input part 17. The electric charge/electrical signal conversion part 16 may just be able to detect fluctuation of the electrical signal according to the electric charge amount of the electric charge input part 17, and various configurations can be employed. For example, an amplifier circuit having a floating diffusion amplifier (floating diffusion amp: FDA) configuration that uses a floating diffusion (FD part), which is a diffusion layer having a parasitic capacitance, for the electric charge input part 17 (in this example, the electric charge storage part), is typically used. For example, a horizontal output gate 230 (Hreg Output Gate: HOG) is arranged at the electric charge/electrical signal conversion part 16 side of the final stage horizontal transfer register 214, and a floating diffusion part is arranged between the electric charge/electrical signal conversion part 16 and the horizontal output gate 230. The floating diffusion part is connected to a gate of a transistor that forms the electric charge/electrical signal conversion part 16. The electric charge/electrical signal conversion part 16 stores the electric charges sequentially injected from the horizontal transfer part 15 in floating diffusion (not illustrated), converts the stored electric charge into a signal voltage, and outputs the signal voltage as an imaging signal Vo (CCD output signal) through an output circuit of a source follower configuration (not illustrated). A source follower of an output stage of the electric charge/electrical signal conversion part 16 does not have sufficient drive ability. Therefore, the imaging signal Vo output from the electric charge/electrical signal conversion part 16 is first input to a buffer part 60, and is transferred to a signal processor of an analog front end AFE through the buffer part 60 so that a CCD output signal amplified in the source follower is not deteriorated. Note that, it is not limited to the above configuration, and various configurations can be employed as long as one has the electric charge/electrical signal conversion function such as a configuration using a floating gate in the electric charge input part 17.

The timing signal generation part 40 generates various pulse signals (two values of an "L" level and an "H" level) for driving the solid-state imaging device 10 and supplies the signals to the driver 42. The driver 42 causes the various drive clocks (drive pulses) supplied from the timing signal generation part 40 to be a drive pulse in a predetermined level, and supplies the drive pulse to the solid-state imaging device 10. For example, the timing signal generation part 40 generates a read pulse VRG for reading out the electric charge stored in the sensor part 11 of the solid-state imaging device 10, and drive clocks of the vertical transfer system such as vertical transfer clocks V1 to Vv for driving and transferring the read out electric charge in the vertical direction and passing the electric charge to the horizontal transfer part 15 (v indicates the number of phases at driving. For example, V4 at 4-phase driving), based on a horizontal synchronization signal (HD) and a vertical synchronization signal (VD). The solid-state imaging device 10 corresponds to an electronic shutter, and the timing signal generation part 40 supplies the electronic shutter pulse SHT to the driver 42 of the vertical transfer system. The timing signal generation part 40 further generates horizontal transfer clocks H1 to Hh (h indicates the number of phases at driving. For example, H2 at 2-phase driving) for driving and transferring the electric charge passed from the vertical transfer part 13 in the horizontal direction and passing the electric charge to the electric charge/electrical signal conversion part 16, and drive clocks of the horizontal transfer system such as a horizontal transfer clock LH for driving the final stage horizontal transfer register 214 (LHreg) and an output clock HRG (reset pulse) for driving the horizontal output gate 230 (HOG).

The driver 42 converts the various clock pulses supplied from the timing signal generation part 40 into a voltage signal (drive pulse) at a predetermined level or into another signal, and supplies the signal to the solid-state imaging device 10. For example, the driver 42 includes the vertical driver 42V that drives a level shift part 42LS and the vertical transfer part 13, the horizontal driver 42H that drives the horizontal transfer part 15, a horizontal output driver 42HRG (a horizontal reset gate driver and an RG driver) that drives the horizontal output gate 230(HOG), and a horizontal final stage driver 42LH (LH driver) that drives the final stage horizontal transfer register 214 (LHreg). Any of the horizontal driver 42H, the horizontal final stage driver 42LH, and the horizontal output driver 42HRG is an example of a horizontal pulse drive unit that outputs a drive pulse of the horizontal transfer system. Various drive clocks are supplied from the timing signal generation part 40 to the level shift part 42LS. The level shift part 42LS converts a low level and a high level of the drive clocks into necessary levels, and supplies the clocks to the vertical driver 42V, the horizontal driver 42H, the horizontal output driver 42HRG, and the horizontal final stage driver 42LH.

Power supplies having voltage values respectively suitable for the level shift part 42LS, the vertical driver 42V, the horizontal driver 42H, the horizontal output driver 42HRG, and the horizontal final stage driver 42LH are supplied thereto. For example, the first electrical potential $V_H$ and the second electrical potential $V_L$ are supplied to the solid-state imaging device 10, the vertical driver 42V, and the like from the drive power supply 46 as power supply voltages, and the horizontal driver power supply potential VHD is supplied as a power supply voltage for the horizontal driver 42H. Further, as a characteristic of Example 1, a connection destination of the anode end of the diode 414 of the protection device 400A is a power supply end of the horizontal driver 42H. Accordingly, the third electrical potential $V_3$ accords with the horizontal driver power supply potential VHD.

Here, the horizontal driver power supply potential VHD (=the third electrical potential $V_3$) satisfies the rated voltage condition of the third electrical potential $V_3$ "$V_3 = V_{HD} > -VL + VF$" or the maximum allowable condition ($V_{3max} = V_{HDmax} > -VL_{min} + VF_{min}$) rises before the power supplies (the first electrical potential $V_H$ and the second electrical potential $V_L$) of the solid-state imaging device 10 and the vertical driver 42V rise at the start of the power supplies, and falls after the power supplies of the solid-state imaging device 10 and the vertical driver 42V fall at the interruption of the power supplies. Accordingly, as described in the basic principle of the element protection, the protection function at the start of a power supply and the protection function at the interruption of a power supply by the protection device 400A (especially, the diode 414) work. Therefore, even if a minus voltage is gone through the substrate voltage terminal φSUB at the start or the interruption of a power supply, the substrate voltage terminal φSUB can be prevented from being in a minus voltage.

Example 2

Figure 9:
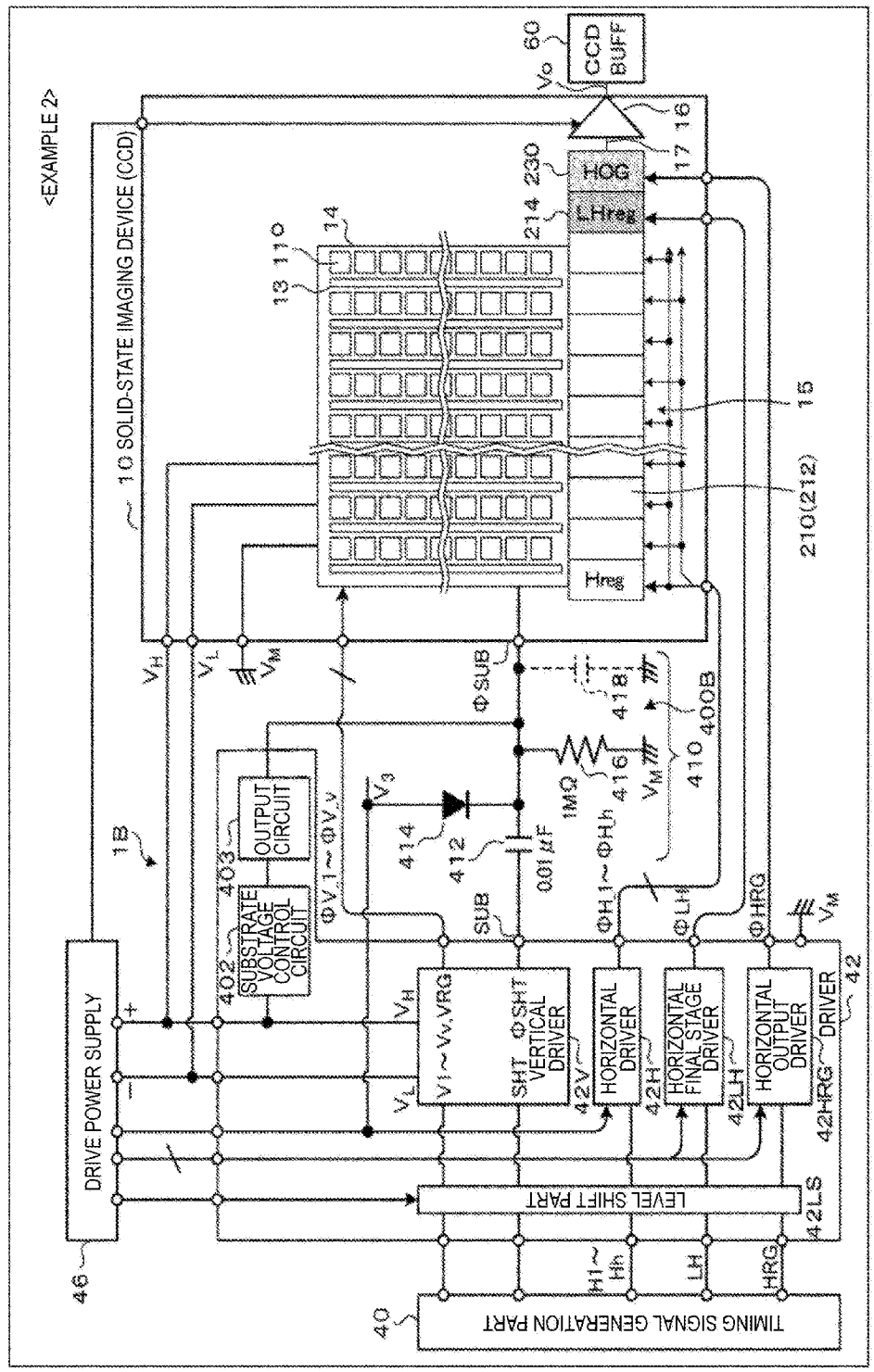
FIG. 9 is a diagram (circuit configuration diagram) describing an imaging device and a protection device of Example 2.

FIG. 9 is a diagram (circuit configuration diagram) describing an imaging device 1B and a protection device 400B of Example 2. In Example 2, compared with Example 1, a substrate voltage control circuit 402 and an output circuit 403 are incorporated in a driver 42 instead of in a solid-state imaging device 10. Example 2 is an example of an external generation type in which a substrate voltage is supplied from the substrate voltage control circuit 402 provided outside the solid-state imaging device 10. The protection device 400B is similar to the protection device 400A.

In Example 2, a connection destination of an anode end of a diode 414 of the protection device 400B is a power supply end of a horizontal driver 42H. A horizontal driver power supply potential $V_{HD}$ (=a third electrical potential $V_3$) satisfies, similarly to Example 1, the rated voltage condition of the third electrical potential $V_3$ or the maximum allowable condition, and the rising order at the start of a power supply and the falling order at the interruption of a power supply are similar to Example 1. Accordingly, in Example 2, a protection function at the start of a power supply and a protection function at the interruption of a power supply by the protection device 400B (especially, the diode 414). Therefore, even if a minus voltage is gone through a substrate voltage terminal φSUB at the start or the interruption of a power supply, the substrate voltage terminal φSUB can be prevented from being in a minus voltage.

Example 3

Figure 10:
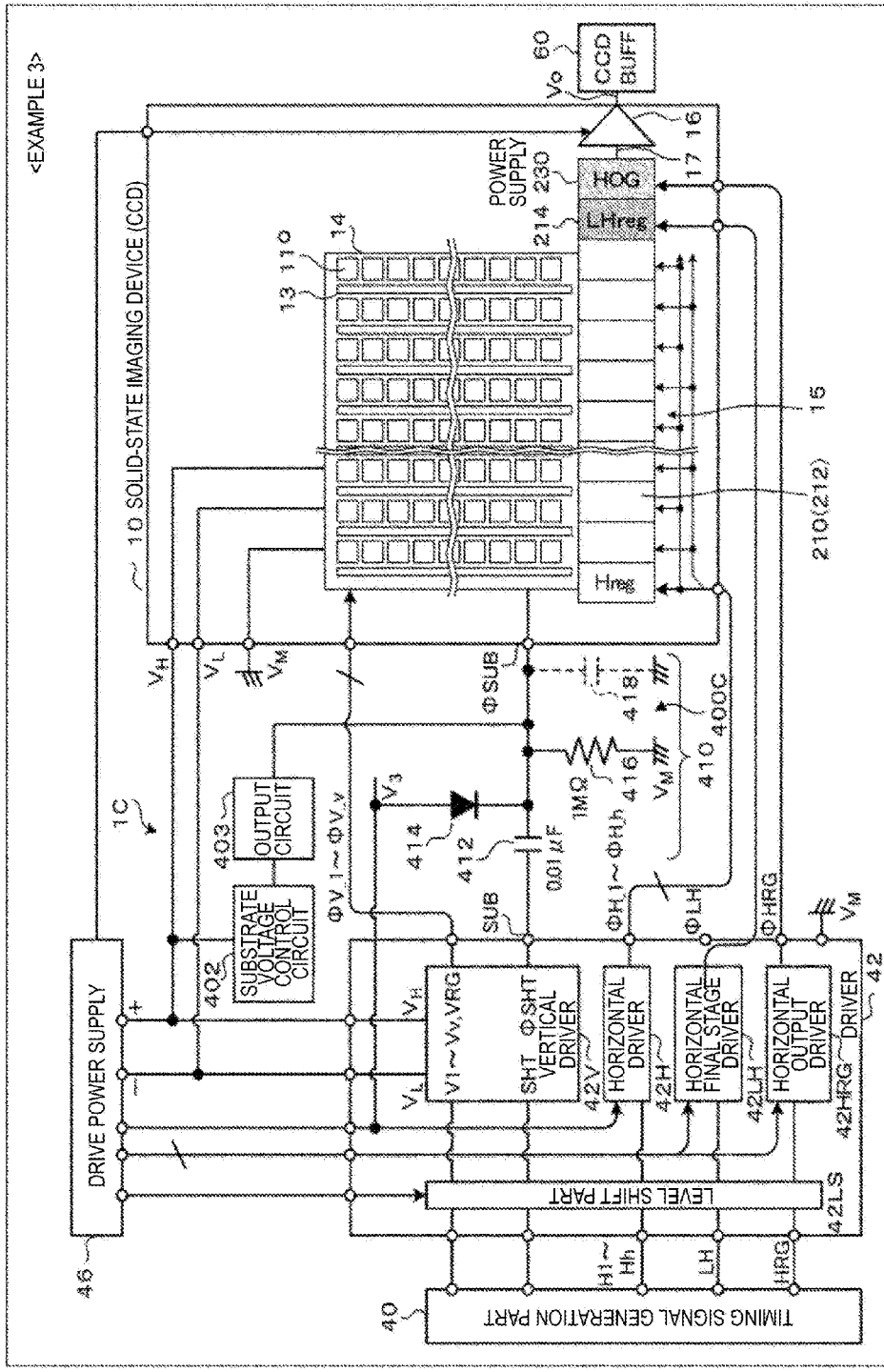
FIG. 10 is a diagram (circuit configuration diagram) describing an imaging device and a protection device of Example 3.

FIG. 10 is a diagram (circuit configuration diagram) describing an imaging device 1C and a protection device 400C of Example 3. Example 3 changes, compared with Example 1, a substrate voltage control circuit 402 and an output circuit 403 to be arranged outside a solid-state imaging device 10 or a driver 42 instead of in the solid-state imaging device 10 or the driver 42. Example 3 is another example of the external generation type in a substrate voltage is supplied from the substrate voltage control circuit 402 provided outside the solid-state imaging device 10. The protection device 400C is similar to the protection device 400A.

In Example 3, a connection destination of an anode end of a diode 414 of the protection device 400C is also a power supply end of a horizontal driver 42H. A horizontal driver power supply potential VHD (=a third electrical potential $V_3$) satisfies, similarly to Example 1, the rated voltage condition of the third electrical potential $V_3$ or the maximum allowable condition, and a rising order at the start of a power supply and a falling order at the interruption of a power supply are similar to Example 1. Accordingly, in Example 3, a protection function at the start of a power supply and a protection function at the interruption of a power supply by the protection device 400C (especially, the diode 414). Therefore, even if a minus voltage is gone through a substrate voltage terminal φSUB at the start or the interruption of a power supply, the substrate voltage terminal φSUB can be prevented from being in a minus voltage.

Modifications of Examples 1 to 3

Figure 11:
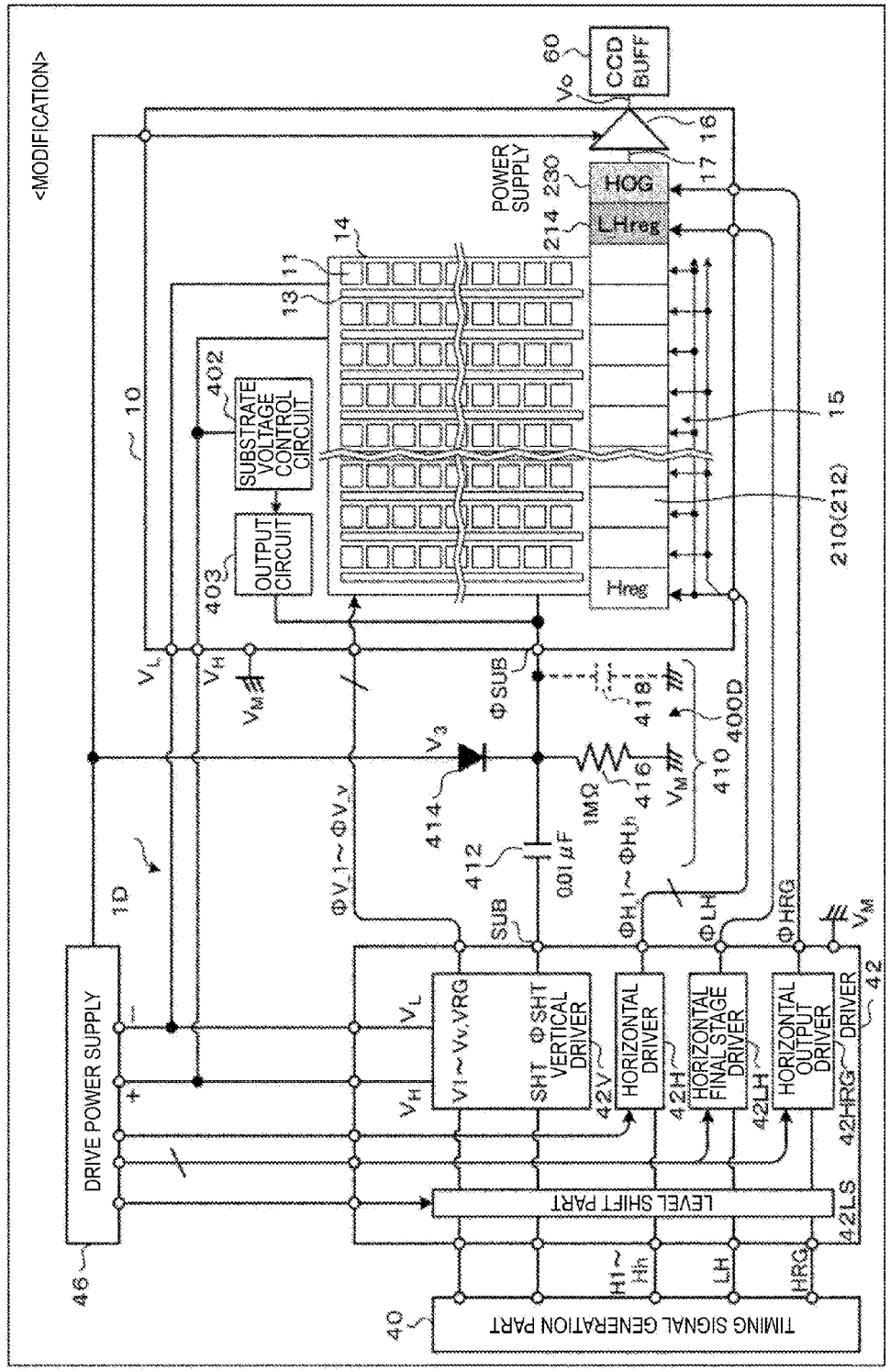
FIG. 11 is a diagram (circuit configuration diagram) describing an imaging device and a protection device of a modification of Examples 1 to 3.

In Examples 1 to 3, the connection destination of the anode end of the diode 414 of the protection device 400 is caused to the power supply end of the horizontal driver 42H, so that the power supply for the horizontal driver 42H is used as the power supply for the third electrical potential V3. However, a power supply that can be used as the power supply for the third electrical potential V3 is not limited to the power supply for the horizontal driver 42H. For example, the power supply for a function part other than the vertical driver 42V, such as the level shift part 42LS, the horizontal output driver 42HRG, or the horizontal final stage driver 42LH, which is similarly incorporated in the driver 42, may be used. Alternatively, as illustrated in FIG. 11, the power supply for the electric charge/electrical signal conversion part 16 that functions as the output circuit of the solid-state imaging device 10 may be used. Since all of the modifications use the power supply for the driver 42 or the solid-state imaging device 10 arranged in the vicinity of the protection device 400, there is no inconvenience of the arrange of wiring. Note that, while FIG. 11 illustrates a modification with respect to the configuration of Example 1, similar modifications are applicable to Examples 2 and 3. Further, it may be configured to arbitrarily select these power supplies. In this case, an optimal power supply is selected according to circumstances and can be used as the power supply for the third electrical potential $V_3$. A configuration of switching and using the power supplies in the driver 42 can be easily realized.

In Modifications, a power supply potential for each function part can satisfy, similarly to Example 1, the rated voltage condition of the third electrical potential $V_3$ or the maximum allowable condition, and a rising order at the start of a power supply and a falling order at the interruption of a power supply can be similar to Example 1. Accordingly, in Modifications, a protection function at the start of a power supply and a protection function at the interruption of a power supply by the protection device 400 (especially, the diode 414). Therefore, even if a minus voltage is gone through a substrate voltage terminal φSUB at the start or the interruption of a power supply, the substrate voltage terminal φSUB can be prevented from being in a minus voltage.

Example 4

Example 4 has a characteristic that, compared with Examples 1 to 3, the power supplies for the function parts (excluding the vertical driver 42V) of the driver 42 or the power supply supplied in the electric charge/electrical signal conversion part 16 of the solid-state imaging device 10 are not used as the power supply for the third electrical potential $V_3$, and a power supply supplied to other function parts is used.

For example, when the imaging device 1 is configured, there may be a case in which the solid-state imaging device 10, the analog front end AFE, the drive control part, and other peripheral circuits are housed in one package and are provided as an imaging device module. The analog front end AFE and the drive control part excluding the solid-state imaging device 10 from the imaging device module are collectively described as a CCD camera front end (an analog front end in a broad sense). Further, the imaging device module, an optical system (an imaging lens is a principal part), and a main unit may configure the imaging device 1 as a whole. The main unit includes a function part that generates a video signal based on an imaging signal obtained from the imaging device module, outputs the signal in a monitor, and stores an image in a predetermined storage medium.

In such a case, as the power supply for the third electrical potential $V_3$, following power supplies may be selection candidates. Of course, as long as the above described conditions for the third electrical potential $V_3$ (the rated voltage condition or the maximum allowable condition, and more favorably, the start condition and the stop condition) are satisfied. Hereinafter, examples will be given. Note that it may be configured to arbitrarily select the power supplies described below. In this case, an optimal power supply is selected according to circumstances and can be used as the power supply for the third electrical potential $V_3$.

First, a power supply used in a CCD camera frond end is a candidate, and for example, a power supply used in a timing pulse generation circuit, a CDS circuit (correlated double sampling), an optical black (OB) clamp circuit, an AD conversion circuit, a calibration circuit, a DLL circuit, a PLL circuit, an input/output (IO) circuit, a high-speed interface circuit, a CMOS output circuit, an LVDS output circuit, or the like can be used. Alternatively, a power supply used in a DSP, an FPGA, a CPU, a memory (volatile memory, SDRAM, non-volatile memory, a flash memory) or the like can be used. Further, a power supply used by an interface unit is a candidate, and for example, a power supply for an interface such as a USB, an HDMI, an RGB output, a video output, PCI Express (registered trademark), a PCI, an AGP, an RS-232C, an ISA, an IDE, and an SATA can be used. A power supply supplied from a battery such as a dry battery, a button battery, or a lithium ion battery can be used. A power supply used by a power supply IC is also a candidate, and for example, a power supply used in a DCDC converter or an ACDC converter can be used. A power supply used by a display unit (display) is also a candidate, and for example, a power supply used in a liquid crystal, an organic EL, a CRT, or a touch panel can be used.

Alternatively, a power supply used by a vibrator or an oscillator, a power supply for communication (regardless of wireless or wired), a power supply used in a stroboscope, or an LED, or a driver power supply used for button operation and the like can be also used. A power supply used by a data storage unit (storage) is also a candidate, and for example, a power supply used by a hard disk device, an SSD, a flexible disk, a compact disk (CD), a DVD, a Blu-ray, an MO, or an HD-DVD can be used. Further, a power supply for lens control, or a power supply for various sensors such as a GPS, an acceleration sensor, or a temperature sensor can be used.

As described above, the technology disclosed in the present specification has been described using embodiments. However, the technical scope described in claims is not limited to the description of the embodiments. Various changes and modifications can be added to the embodiments without departing from the gist of the technology disclosed in the present specification, and embodiments to which such changes and modifications are added are also included in the technical scope of the technology disclosed in the present specification. The embodiments do not limit the technology claimed in the claims, and all combinations of the characteristics described in the embodiments are not necessarily indispensable for the solutions to the problems addressed by the technology disclosed in the present specification. The above-described embodiments include technologies of various stages, and various technologies can be extracted by appropriate combinations of a plurality of disclosed requirements. Even if several requirements are removed from all of the requirements described in the embodiments, a configuration from which the several requirements have been removed can also be extracted as the technology disclosed in the present specification as long as the effects corresponding to the problem addressed by the technology disclosed in the present specification can be obtained.

For example, the technology described in claims is an example and the following technologies are extracted in light of the description of the embodiments. Hereinafter, the technologies are listed.

[Note 1]
An imaging device including:
  a solid-state imaging device in which a voltage pulse is applied to a first polarity semiconductor;
  a pulse drive unit configured to output a drive pulse of the solid-state imaging device; and
  a protection unit arranged between the pulse drive unit and the solid-state imaging device,
  wherein the protection unit includes a capacitor connected between an output terminal of the pulse drive unit and a voltage terminal of the solid-state imaging device, a diode connected between a potential point and the voltage terminal, and a resistor element connected between the voltage terminal and a potential point,
  an anode end of the diode is connected to the potential point to which a potential of the voltage terminal is applied, and
  at a start of a power supply to the solid-state imaging device, the potential of the potential point is started before the start of a power supply.

[Note 2]
The imaging device according to Note 1, wherein a potential corresponding to a maximum rated voltage of the voltage terminal is applied to the potential point.

[Note 3]
The imaging device according to Note 1 or 2, wherein a potential falling below a sum of a rated voltage of the voltage terminal and a forward drop voltage of the diode is applied to the potential point.

[Note 4]
The imaging device according to Note 3, wherein a potential falling below a sum of a minimum allowable voltage of the voltage terminal and the forward drop voltage of the diode is applied to the potential point.

[Note 5]
The imaging device according to any one of Notes 1 to 4, wherein a potential falling below a sum of a rated voltage of the voltage terminal and a minimum value of a forward drop voltage of the diode is applied.

[Note 6]
The imaging device according to Note 5, wherein a potential falling below a sum of a minimum allowable voltage of the voltage terminal and the minimum value of the forward drop voltage of the diode is applied to the potential point.

[Note 7]
The imaging device according to any one of Notes 1 to 6, wherein the pulse drive unit includes a vertical pulse drive unit configured to output a drive pulse of a vertical transfer system, and a horizontal pulse drive unit configured to output a drive pulse of a horizontal transfer system, and
  at a start of power supplies to the vertical pulse drive unit and the solid-state imaging device, the potential of the potential point is started before the start of power supplies.

[Note 8]
The imaging device according to any one of Notes 1 to 7, wherein a power supply configured to output a first electrical potential in a first direction with respect to a reference potential and corresponding to the first polarity, and a second electrical potential in a second direction opposite to the first direction with respect to the reference potential is used as a power supply of the solid-state imaging device, and
  at a start of a power supply, the second electrical potential is started after the first electrical potential is started.

[Note 9]
The imaging device according to any one of Notes 1 to 8, wherein, at an interruption of a power supply to the solid-state imaging device, the potential of the potential point is interrupted after the power supply is interrupted.

[Note 10]
The imaging device according to Note 9, wherein a power supply configured to output a first electrical potential in a first direction with respect to a reference potential and corresponding to the first polarity, and a second electrical potential in a second direction opposite to the first direction with respect to the reference potential is used as a power supply of the solid-state imaging device, and,
  at an interruption of a power supply, the first electrical potential is interrupted after the second electrical potential is interrupted.

[Note 11]
The imaging device according to any one of Notes 1 to 10, wherein the pulse drive unit includes a vertical pulse drive unit configured to output a drive pulse of a vertical transfer system and a horizontal pulse drive unit configured to output a drive pulse of a horizontal transfer system, and
  the potential point is connected to a power supply for the horizontal pulse drive unit.

[Note 12]
The imaging device according to any one of Notes 1 to 10, wherein the solid-state imaging device includes an output part configured to output an imaging signal, and
  the potential point is connected to a power supply for the output part.

[Note 13]
The imaging device according to any one of Notes 1 to 10, wherein the potential point is connected to a power supply for a function part other than for the solid-state imaging device and for the pulse drive unit.

[Note 14]
The imaging device according to any one of Notes 1 to 13, including a substrate voltage control circuit configured to apply a predetermined potential to the voltage terminal,
  wherein the substrate voltage control circuit is incorporated in the solid-state imaging device.

[Note 15]
The imaging device according to any one of Notes 1 to 13, including a substrate voltage control circuit configured to apply a predetermined potential to the voltage terminal,
  wherein the substrate voltage control circuit is incorporated in the pulse drive unit.

[Note 16]
The imaging device according to any one of Notes 1 to 13, including a substrate voltage control circuit configured to apply a predetermined potential to the voltage terminal,
  wherein the substrate voltage control circuit is arranged outside the solid-state imaging device and the pulse drive unit.

[Note 17]

The imaging device according to any one of Notes 1 to 16, wherein the protection unit includes the capacitor connected to the resistor element in parallel.

[Note 18]

A protection device configured to protect a solid-state imaging device, in which a voltage pulse is applied to a first polarity semiconductor, arranged between a pulse drive unit configured to output a drive pulse of the solid-state imaging device and the solid-state imaging device, including a capacitor connected between an output terminal of the pulse drive unit and a voltage terminal of the solid-state imaging device, a diode connected between a potential point and the voltage terminal, and a resistor element connected between the voltage terminal and a potential point, an anode end of the diode being connected to the potential point to which a potential of the voltage terminal is applied, and at a start of a power supply to the solid-state imaging device, the potential of the potential point is started before the start of a power supply.

[Note 19]

The protection device according to Note 18, wherein the pulse drive unit includes a vertical pulse drive unit configured to output a drive pulse of a vertical transfer system, and a horizontal pulse drive unit configured to output a drive pulse of a horizontal transfer system, and at a start of power supplies to the vertical pulse drive unit and the solid-state imaging device, the potential of the potential point is started before the start of power supplies.

[Note 20]

The imaging device according to Note 18 or 19, wherein, at an interruption of a power supply to the solid-state imaging device, the potential of the potential point is interrupted after the power supply is interrupted.

REFERENCE SIGNS LIST

1 Imaging device
10 Solid-state imaging device
11 Sensor part
13 Vertical transfer part (vertical CCD)
14 Imaging area
15 Horizontal transfer part (horizontal CCD)
16 Electric charge/electrical signal conversion part
40 Timing signal generation part
42 Driver
42H Horizontal driver
42LH Horizontal final stage driver
42HRG Horizontal output driver
42V Vertical driver
46 Drive power supply
60 Buffer part
210 Horizontal transfer path
212 Horizontal transfer register
214 Final stage horizontal transfer register
230 Horizontal output gate
400 Protection device (protection unit)
410 Clamp circuit
412 Capacitor
414 Diode
416 Resistor element
418 Capacitor

The invention claimed is:

1. An imaging device comprising:
   a solid-state imaging device in which a voltage pulse is applied to a first polarity semiconductor;
   a pulse drive unit configured to output a drive pulse of the solid-state imaging device; and
   a protection unit arranged between the pulse drive unit and the solid-state imaging device,
   wherein the protection unit includes a capacitor connected between an output terminal of the pulse drive unit and a voltage terminal of the solid-state imaging device, a diode connected between a potential point and the voltage terminal, and a resistor element connected between the voltage terminal and a potential point,
   an anode end of the diode is connected to the potential point to which a potential of the voltage terminal is applied, and
   at a start of a power supply to the solid-state imaging device, the potential of the potential point is started before the start of a power supply.

2. The imaging device according to claim 1, wherein a potential corresponding to a maximum rated voltage of the voltage terminal is applied to the potential point.

3. The imaging device according to claim 1, wherein a potential falling below a sum of a rated voltage of the voltage terminal and a forward drop voltage of the diode is applied to the potential point.

4. The imaging device according to claim 3, wherein a potential falling below a sum of a minimum allowable voltage of the voltage terminal and the forward drop voltage of the diode is applied to the potential point.

5. The imaging device according to claim 1, wherein a potential falling below a sum of a rated voltage of the voltage terminal and a minimum value of a forward drop voltage of the diode is applied.

6. The imaging device according to claim 5, wherein a potential falling below a sum of a minimum allowable voltage of the voltage terminal and the minimum value of the forward drop voltage of the diode is applied to the potential point.

7. The imaging device according to claim 1, wherein the pulse drive unit includes a vertical pulse drive unit configured to output a drive pulse of a vertical transfer system, and a horizontal pulse drive unit configured to output a drive pulse of a horizontal transfer system, and
   at a start of power supplies to the vertical pulse drive unit and the solid-state imaging device, the potential of the potential point is started before the start of power supplies.

8. The imaging device according to claim 1, wherein a power supply configured to output a first electrical potential in a first direction with respect to a reference potential and corresponding to the first polarity, and a second electrical potential in a second direction opposite to the first direction with respect to the reference potential is used as a power supply of the solid-state imaging device, and
   at a start of a power supply, the second electrical potential is started after the first electrical potential is started.

9. The imaging device according to claim 1, wherein, at an interruption of a power supply to the solid-state imaging device, the potential of the potential point is interrupted after the power supply is interrupted.

10. The imaging device according to claim 9, wherein a power supply configured to output a first electrical potential in a first direction with respect to a reference potential and corresponding to the first polarity, and a second electrical potential in a second direction opposite to the first direction with respect to the reference potential is used as a power supply of the solid-state imaging device, and, at an interruption of a power supply, the first electrical potential is interrupted after the second electrical potential is interrupted.

11. The imaging device according to claim 1, wherein the pulse drive unit includes a vertical pulse drive unit configured to output a drive pulse of a vertical transfer system and a horizontal pulse drive unit configured to output a drive pulse of a horizontal transfer system, and the potential point is connected to a power supply for the horizontal pulse drive unit.

12. The imaging device according to claim 1, wherein the solid-state imaging device includes an output part configured to output an imaging signal, and the potential point is connected to a power supply for the output part.

13. The imaging device according to claim 1, wherein the potential point is connected to a power supply for a function part other than for the solid-state imaging device and for the pulse drive unit.

14. The imaging device according to claim 1, including a substrate voltage control circuit configured to apply a predetermined potential to the voltage terminal, wherein the substrate voltage control circuit is incorporated in the solid-state imaging device.

15. The imaging device according to claim 1, including a substrate voltage control circuit configured to apply a predetermined potential to the voltage terminal, wherein the substrate voltage control circuit is incorporated in the pulse drive unit.

16. The imaging device according to claim 1, including a substrate voltage control circuit configured to apply a predetermined potential to the voltage terminal, wherein the substrate voltage control circuit is arranged outside the solid-state imaging device and the pulse drive unit.

17. The imaging device according to claim 1, wherein the protection unit includes the capacitor connected to the resistor element in parallel.

18. A protection device configured to protect a solid-state imaging device, in which a voltage pulse is applied to a first polarity semiconductor, arranged between a pulse drive unit configured to output a drive pulse of the solid-state imaging device and the solid-state imaging device, including a capacitor connected between an output terminal of the pulse drive unit and a voltage terminal of the solid-state imaging device, a diode connected between a potential point and the voltage terminal, and a resistor element connected between the voltage terminal and a potential point, an anode end of the diode being connected to the potential point to which a potential of the voltage terminal is applied, and at a start of a power supply to the solid-state imaging device, the potential of the potential point is started before the start of a power supply.

19. The protection device according to claim 18, wherein the pulse drive unit includes a vertical pulse drive unit configured to output a drive pulse of a vertical transfer system, and a horizontal pulse drive unit configured to output a drive pulse of a horizontal transfer system, and at a start of power supplies to the vertical pulse drive unit and the solid-state imaging device, the potential of the potential point is started before the start of power supplies.

20. The protection device according to claim 18, wherein, at an interruption of a power supply to the solid-state imaging device, the potential of the potential point is interrupted after the power supply is interrupted.

* * * * *